US006665344B1

(12) United States Patent
Fimoff

(10) Patent No.: US 6,665,344 B1
(45) Date of Patent: Dec. 16, 2003

(54) DOWNCONVERTING DECODER FOR INTERLACED PICTURES

(75) Inventor: Mark Fimoff, Hoffman Estates, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/106,367

(22) Filed: Jun. 29, 1998

(51) Int. Cl.[7] ................................................ H04N 7/12
(52) U.S. Cl. ................................................ 375/240.2
(58) Field of Search .............................. 348/402, 441; 375/240; 358/133; 708/402

(56) References Cited

U.S. PATENT DOCUMENTS

| | | | | |
|---|---|---|---|---|
| 5,049,992 A | | 9/1991 | Citta et al. .................... | 358/140 |
| 5,262,854 A | * | 11/1993 | Ng .............................. | 358/133 |
| 5,633,682 A | * | 5/1997 | Tahara ...................... | 375/240.23 |
| 5,654,910 A | * | 8/1997 | Iwata ......................... | 364/725 |
| 5,805,483 A | * | 9/1998 | Shim .......................... | 708/402 |
| 5,903,311 A | * | 5/1999 | Ozcelik et al. ........... | 375/240.2 |
| 5,957,998 A | * | 9/1999 | Ozaki ......................... | 708/402 |
| 6,025,878 A | * | 2/2000 | Boyce et al. .............. | 348/402 |
| 6,028,648 A | * | 2/2000 | Yu .............................. | 375/240.27 |
| 6,184,935 B1 | * | 2/2001 | Iaquinto et al. ........... | 248/441 |
| 6,175,592 B1 | * | 6/2001 | Kim et al. .................. | 375/240 |

FOREIGN PATENT DOCUMENTS

| | | | | |
|---|---|---|---|---|
| EP | 0 576 290 | 12/1993 | .......... | H04N/7/137 |
| EP | 0 707 426 | 4/1996 | ............ | H04N/7/26 |
| EP | 0 786 902 | 7/1997 | ............ | H04N/7/30 |
| WO | WO 98/41011 | 9/1998 | ............ | H04N/5/44 |

OTHER PUBLICATIONS

Mokry, R., et al., "Minimal Error Drift in Frequency Scalability for Motion–Compensated DCT Coding," IEEE Transactions On Circuits and Systems for Video Technology, Aug. 1994, vol. 4, No. 4, pp. 392–406.

Johnson, A. W., et al., "Drift Minimisation In Frequency Scalable Coders Using Block Based Filtering," Applied Research & Development.

Johnson, A. W., et al., "Rational Value Decimation Using the DCT For Layered Coding," Monash University, Telecom Australia Research Laboratories, (1991).

Vetro, A, "Frequency Domain Down–Conversion of HDTV Using An Optimal Motion Compensation Scheme", *International Journal of Imaging Systems and Technology*, US, John Wiley & Sons, New York, vol. 9, No. 4, pp. 274–282, (Jan. 1, 1998).

International Search Report, dated Mar. 4, 2000, Application No. PCT/US99/15254.

* cited by examiner

*Primary Examiner*—Chris Kelley
*Assistant Examiner*—George A. Bugg

(57) ABSTRACT

Received frame and field coded DCT coefficient blocks are downconverted to lower resolution reconstructed pixel field blocks so that, for example, HDTV programs can be played on NTSC receivers. The frame and field coded DCT coefficient blocks have motion vectors associated therewith. Specifically, the received frame coded DCT coefficient blocks are converted to converted field coded DCT coefficient blocks and an IDCT module is performed on the converted field coded DCT coefficient blocks to produce downconverted field residual or pixel blocks. Also, an IDCT is performed directly on the received field coded DCT coefficient blocks to produce downconverted field residual or pixel blocks. Reference pixel blocks are selected based upon the motion vectors, the reference pixel blocks are upsampled, and the upsampled reference pixel blocks are downsampled. The upsampled and downsampled reference pixel blocks form predictions that are added to the field residual blocks in order to form reconstructed pixel field blocks.

44 Claims, 13 Drawing Sheets

Step 3: Shuffle A and B to Create Frame Prediction

Step 4: If Motion Vector Requires Additional 1/2 Pixel Interpolation

Prediction After 1/2 Pixel Interpolation

Step 5: Spatial Filter and Downsample   OR

DOWNCONVERTING DECODER FOR INTERLACED PICTURES

TECHNICAL FIELD OF THE INVENTION

The present invention relates to a downconverting decoder for downconverting and decoding high resolution encoded video for display by a lower resolution receiver.

BACKGROUND OF THE INVENTION

The international standard ISO/IEC 13818-2 (Generic Coding of Motion Pictures and Associated Audio Information: Video) and the "Guide to the use of the ATSC Digital Television Standard" describe a system, known as MPEG-2, for encoding and decoding digital video data. According to this system, digital video data is encoded as a series of code words in a complicated manner that causes the average length of the code words to be much smaller than would be the case if, for example, each pixel in every frame was coded as an eight bit value. This type of encoding is also known as data compression.

The standard allows for encoding of video over a wide range of resolutions, including higher resolutions commonly known as HDTV. In MPEG-2, encoded pictures are made up of pixels. Each 8×8 array of pixels is known as a block, and a 2×2 array of blocks is known as a macroblock. Compression is achieved by using well known techniques including (i) prediction (motion estimation in the encoder and motion compensation in the decoder), (ii) two dimensional discrete cosine transform (DCT) which is performed on 8×8 blocks of pixels, (iii) quantization of the resulting DCT coefficients, and (iv) Huffman and run/level coding. In MPEG-2 encoding, pictures which are encoded without prediction are referred to as I pictures, pictures which are encoded with prediction from previous pictures are referred to as P pictures, and pictures which are encoded with prediction from both previous and subsequent pictures are referred to as B pictures.

An MPEG-2 encoder 10 is shown in simplified form in FIG. 1. Data representing macroblocks of pixel values are fed to both a subtractor 12 and a motion estimator 14. In the case of P pictures and B pictures, the motion estimator 14 compares each new macroblock (i.e., a macroblock to be encoded) with the macroblocks in a reference picture previously stored in a reference picture memory 16. The motion estimator 14 finds the macroblock in the stored reference picture that most closely matches the new macroblock.

The motion estimator 14 reads this matching macroblock (known as a predicted macroblock) out of the reference picture memory 16 and sends it to the subtractor 12 which subtracts it, on a pixel by pixel basis, from the new macroblock entering the MPEG-2 encoder 10. The output of the subtractor 12 is an error, or residual, that represents the difference between the predicted macroblock and the new macroblock being encoded. This residual is often very small. The residual is transformed from the spatial domain by a two dimensional DCT 18. The DCT residual coefficients resulting from the two dimensional DCT 18 are then quantized by a quantization block 20 in a process that reduces the number of bits needed to represent each coefficient. Usually, many coefficients are effectively quantized to zero. The quantized DCT coefficients are Huffman and run/level coded by a coder 22 which further reduces the average number of bits per coefficient.

The motion compensator 14 also calculates a motion vector (mv) which represents the horizontal and vertical displacement of the predicted macroblock in the reference picture from the position of the new macroblock in the current picture being encoded. It should be noted that motion vectors may have ½ pixel resolution which is achieved by linear interpolation between adjacent pixels. The data encoded by the coder 22 are combined with the motion vector data from the motion estimator 14 and with other information (such as an indication of whether the picture is an I, P or B picture), and the combined data are transmitted to a receiver that includes an MPEG-2 decoder 30.

For the case of P pictures, the quantized DCT coefficients from the quantization block 20 are also supplied to an internal loop that represents the operation of the MPEG-2 decoder 30. Within this internal loop, the residual from the quantization block 20 is inverse quantized by an inverse quantization block 24 and is inverse DCT transformed by an inverse discrete cosine transform (IDCT) block 26. The predicted macroblock, that is read out of the reference picture memory 16 and that is supplied to the subtractor 12, is also added back to the output of the IDCT block 26 on a pixel by pixel basis by an adder 28, and the result is stored back into the reference picture memory 16 in order to serve as a macroblock of a reference picture for predicting subsequent pictures. The object of this internal loop is to have the data in the reference picture memory 16 of the MPEG-2 encoder 10 match the data in the reference picture memory of the MPEG-2 decoder 30. B pictures are not stored as reference pictures.

In the case of I pictures, no motion estimation occurs and the negative input to the subtractor 12 is forced to zero. In this case, the quantized DCT coefficients provided by the two dimensional DCT 18 represent transformed pixel values rather than residual values, as is the case with P and B pictures. As in the case of P pictures, decoded I pictures are stored as reference pictures.

The MPEG-2 decoder 30 illustrated in FIG. 2 is a simplified showing of an MPEG-2 decoder. The decoding process implemented by the MPEG-2 decoder 30 can be thought of as the reverse of the encoding process implemented by the MPEG-2 encoder 10. The received encoded data is Huffman and run/level decoded by a Huffman and run/level decoder 32. Motion vectors and other information are parsed from the data stream flowing through the Huffman and run/level decoder 32. The motion vectors are fed to a motion compensator 34. Quantized DCT coefficients at the output of the Huffman and run/level decoder 32 are fed to an inverse quantization block 36 and then to an IDCT block 38 which transforms the inverse quantized DCT coefficients back into the spatial domain.

For P and B pictures, each motion vector is translated by the motion compensator 34 to a memory address in order to read a particular macroblock (predicted macroblock) out of a reference picture memory 42 which contains previously stored reference pictures. An adder 44 adds this predicted macroblock to the residual provided by the IDCT block 38 in order to form reconstructed pixel data. For I pictures, there is no reference picture so that the prediction provided to the adder 44 is forced to zero. For I and P pictures, the output of the adder 42 is fed back to the reference picture memory 42 to be stored as a reference picture for future predictions.

The MPEG encoder 10 can encode sequences of progressive or interlaced pictures. For sequences of interlaced pictures, pictures may be encoded as field pictures or as frame pictures. For field pictures, one picture contains the odd lines of the raster, and the next picture contains the even lines of the raster. All encoder and decoder processing is done on fields. Thus, the DCT transform is performed on 8×8 blocks that contain all odd or all even numbered lines. These blocks are referred to as field DCT coded blocks.

On the other hand, for frame pictures, each picture contains both odd and even numbered lines of the raster. Macroblocks of frame pictures are encoded as frames in the sense that an encoded macroblock contains both odd and even lines. However, the DCT performed on the four blocks within each macroblock of a frame picture may be done in two different ways. Each of the four DCT transform blocks in a macroblock may contain both odd and even lines (frame DCT coded blocks), or alternatively two of the four DCT blocks in a macroblock may contain only the odd lines of the macroblock and the other two blocks may contain only the even lines of the macroblock (field DCT coded blocks). The coding decision as to which way to encode a picture may be made adaptively by the MPEG-2 encoder 10 based upon which method results in better data compression.

Residual macroblocks in field pictures are field DCT coded and are predicted from a reference field. Residual macroblocks in frame pictures that are frame DCT coded are predicted from a reference frame. Residual macroblocks in frame pictures that are field DCT coded have two blocks predicted from one reference field and two blocks predicted from either the same or other reference field.

For sequences of progressive pictures, all pictures are frame pictures with frame DCT coding and frame prediction.

MPEG-2, as described above, includes the encoding and decoding of video at high resolution (HDTV). In order to permit people to use their existing NTSC televisions in order to view HDTV transmitted programs, it is desirable to provide a decoder that decodes high resolution MPEG-2 encoded data as reduced resolution video data for display on existing NTSC televisions. (Reducing the resolution of television signals is often called down conversion decoding.) Accordingly, such a downconverting decoder would allow the viewing of HDTV signals without requiring viewers to buy expensive HDTV displays.

There are known techniques for making such a downconverting decoder such that it requires less circuitry and is, therefore, cheaper than a decoder that outputs full HDTV resolution. One of these methods is disclosed in U.S. Pat. No. 5,262,854. The down conversion technique disclosed there is explained herein in connection with a down convertor 50 shown in FIG. 3. The down convertor 50 includes a Huffman and run/level decoder 52 and an inverse quantization block 54 which operate as previously described in connection with the Huffman and run/level decoder 32 and the inverse quantization block 36 of FIG. 2. However, instead of utilizing the 8×8 IDCT block 38 as shown in FIG. 2, the down convertor 50 employs a downsampler 56 which discards the forty-eight high order DCT coefficients of an 8×8 block and performs a 4×4 IDCT on the remaining 4×4 array of DCT coefficients. This process is usually referred to as DCT domain downsampling. The result of this downsampling is effectively a filtered and downsampled 4×4 block of residual samples (for P or B pictures) or pixels for I pictures.

For residual samples, a prediction is added by an adder 58 to the residual samples from the downsampler 56 in order to produce a decoded reduced resolution 4×4 block of pixels. This block is saved in a reference picture memory 60 for subsequent predictions. Accordingly, predictions will be made from a reduced resolution reference, while predictions made in the decoder loop within the encoder are made from full resolution reference pictures. This difference means that the prediction derived from the reduced resolution reference will differ by some amount from the corresponding prediction made by the encoder, resulting in error in the residual plus prediction sum provided by the adder 58 (this error is referred to herein as prediction error). This error may increase as predictions are made upon predictions until the reference is refreshed by the next I picture.

A motion compensator 62 attempts to reduce this prediction error by using the full resolution motion vectors, even though the reference picture is at lower resolution. First, a portion of the reference picture that includes the predicted macroblock is read from the reference picture memory 60. This portion is selected based on all bits of the motion vector except the least significant bit. This predicted macroblock is interpolated back to full resolution by a 2×2 prediction upsample filter 64. Using the full resolution motion vector (which may include ½ pixel resolution), a predicted full resolution macroblock is extracted from the upsampled portion based upon all of the bits of the motion vector. Then, a downsampler 66 performs a 2×2 downsampling on the extracted full resolution macroblock in order to match the resolution of the 4×4 IDCT output of the downsampler 56. In this way, the prediction from the reference picture memory 60 is upsampled to match the full resolution residual pixel structure allowing the use of full resolution motion vectors. Then, the full resolution reference picture is downsampled prior to addition by the adder 58 in order to match the resolution of the downsampled residual from the downsampler 56.

There are several known good prediction upsampling/downsampling methods that tend to minimize the prediction error caused by upsampling reference pictures that have been downsampled with a 4×4 IDCT. These methods typically involve use of a two dimensional filter having five to eight taps and tap values that vary both with the motion vector value for the predicted macroblock and the position of the current pixel being interpolated within the predicted macroblock. Such a filter not only upsamples the reduced resolution reference to full resolution and subsequently downsamples in a single operation, but it can also include additional ½ pixel interpolation (when required due to a fractional motion vector). (See, for example, Minimal Error Drift in Frequency Scalability for Motion Compensated DCT Coding, Mokry and Anastassiou, *IEEE Transactions on Circuits and Systems for Video Technology*, August 1994, and Drift Minimization in Frequency Scaleable Coders Using Block Based Filtering, Johnson and Princen, *IEEE Workshop on Visual Signal Processing and Communication*, Melbourne, Australia, September 1993.) The objective of such upsampling and downsampling is for the prediction upsampling filter to be a close spatial domain approximation to the effective filtering operation done by a 4×4 IDCT.

The following example is representative of the prediction upsampling/downsampling filter described in the Mokry and Johnson papers. This example is a one dimensional example but is easily extended to two dimensions. Let it be assumed that pixels y1 and pixels y2 as shown in FIG. 4 represent two adjacent blocks in a downsampled reference picture, and that the desired predicted block stradles the boundary between the two blocks. The pixels y1 are upsampled to the pixels p1 by using a four tap filter with a different set of tap values for each of the eight calculated pixels p1. The pixels y2 are likewise upsampled to the pixels p2 by using the same four tap filter arrangement. (If the motion vector requires ½ pixel interpolation, this interpolation is done using linear interpolation to calculate in between pixel values based on the pixels p1 and p2.) From these sixteen pixels p1 and pixels p2, an upsampled prediction consisting of eight pixels q can be read using the full resolution motion vector. The pixels q are then filtered and downsampled to pixels q' by an eight tap filter with a different set of tap values for each of the four pixels q'. The Johnson paper teaches how to determine the optimum tap values for these filters given that the reference picture was downsampled by a four point IDCT. The tap points are optimum in the sense that the prediction error is minimized. The Johnson and Mokry papers also show that the upsampling, linear interpolation, and downsampling filters can be combined into a single eight tap filter with tap values that depend on the motion vector value and the particular pixels q' being calculated. Accordingly, this single eight tap filter allows four pixels q' to be calculated directly from the eight pixels y1 and y2.

The down convertor 50, while generally adequate for progressive pictures with frame DCT coded blocks, does not address problems that arise when attempting to down convert sequences of interlaced pictures with mixed frame and field DCT coded blocks. These problems arise, for the most part, with respect to vertical prediction upsampling, and are described below in a one dimensional vertical context. Thus, for the purpose of this description, a full resolution block refers to an eight pixel vertical column with a downsampled block having a corresponding vertical column of four pixels.

Let it be assumed that an eight point vertical column of pixels as shown in column 70 of FIG. 5 is transformed into DCT coefficients by an encoder utilizing an eight point DCT transform operation. A downconverting decoder discards the four high order coefficients for each block and performs a four point IDCT on the remaining coefficients (DCT domain downsampling). The spatial relationship between the original pixels x and the decoded pixels y is shown by columns 70 and 72. The pixels y represent the stored reference picture.

Prediction upsampling/downsampling methods, such as those previously referenced (Mokry, Johnson), which operate on DCT domain downsampled reference pictures, result in the spatial relationships shown in FIG. 6, where the reference pixels y are first upsampled to produce upsampled reference pixels p (these approximate the original pixels x) and the upsampled reference pixels p are then downsampled to produce downsampled reference pixels q. These methods attempt to effectively reverse the DCT domain downsampling with a minimal or small error due to the discarding of the high order DCT coefficients when the 4×4 IDCT is performed. The objective is for the prediction upsampling filter to be a close spatial domain approximation to the effective filtering operation done by a 4×4 IDCT.

The typical operation of such a filter operating vertically is explained as follows. A portion of the lower resolution reference picture consisting of two pixel blocks (e.g., the $y_1$ and $y_2$ pixel blocks of column 80) overlapped by the desired predicted block is accessed. As shown in column 82, these two pixel blocks are upsampled and filtered to approximate the full resolution reference so that the pixels $p_1$ and $p_2$ approximate full resolution pixels x. Then, the pixels $p_1$ and $p_2$ are filtered and downsampled to produce pixels q as shown in column 84. The pixels q form the predicted block that is supplied to the adder 58.

This upsampling/downsampling process can either be a two step filtering process, or the pixels q can be directly calculated from the pixels y using, for example, an eight tap filter whose filter coefficients vary with the motion vector value and the particular pixels q being calculated, as described in the Johnson and Mokry papers. As shown in FIG. 7, prediction upsampling/downsampling filters can also include additional ½ pixel interpolation (approximation of pixel values between original pixels x) when the motion vector is fractional.

It is noted that the pixels y due to DCT domain downsampling are effectively spatially located half way between the original pixels x. This spatial relationship has important implications because, as previously explained, the DCT blocks may be frame or field encoded. For example, if it is assumed that a full resolution frame consisting of fields A and B is encoded by the encoder, and if these fields are field DCT encoded, the DCT domain downsampling must be performed by a down conversion decoder separately on each field block. The resulting vertical spatial relationship of pixels in the downsampled fields a and b with respect to pixels in the original fields A and B is shown in FIG. 8, where the original encoded fields A and B are shown in column 90 and the downsampled fields a and b are shown in column 92. It should be noted that the pixels b are not evenly spaced between the pixels a.

On the other hand, with frame DCT encoding, pixels from fields A and B are combined together into DCT blocks by the encoder. DCT domain downsampling on these frame DCT coded blocks results in the pixel spatial relationship shown in FIG. 9, where the original frame DCT encoded fields A and B are shown in column 94 and the downsampled frame c is shown in column 96. It should be noted that the pixels c are evenly spaced.

According to the MPEG-2 standard, a picture may be encoded with all macroblocks containing frame DCT coded blocks, with all macroblocks containing field DCT coded blocks, or with a mix of field and frame coded macroblocks. Therefore, performing DCT domain downsampling as shown by the prior art results in reference pictures that have a varying pixel structure. An entire reference picture may have the a/b structure shown in column 92 or the c structure shown in column 96. On the other hand, a reference picture may be composed of macroblocks, some having the a/b structure of column 92 and others having the c structure of column 96.

When forming a predicted macroblock, as previously explained, the reference picture must be upsampled so that it matches its original full resolution structure. The prediction upsampling operation is made more complicated because the two different reference picture pixel structures shown in columns 92 and 96 require different upsampling processes. Because the pixels in the c structured reference picture shown in column 96 have resulted from DCT domain downsampling of a frame, prediction upsample filtering must be performed on the reference macroblock as a frame to derive the A and B fields together. However, because the pixels in the a/b structured reference pictures shown in column 92 have resulted from DCT domain downsampling of separate fields, prediction upsample filtering must be performed separately on each field (a and b) of the reference macroblock in order to derive the A and then B fields shown in column 90.

A further complication is introduced when reference blocks have a mixed macroblock pixel structure because predicted macroblocks from the reference picture may straddle stored reference macroblocks, some having the c structure and some having the a/b structure. In this case, two different prediction upsample processes would have to be executed for different parts of the same predicted macroblock.

Moreover, a particular disadvantage of using the c structure shown in column 96 for reference pictures becomes apparent when it is necessary to do field prediction from a c structured reference, where the A/B structured full resolution reference contains high vertical frequencies. For example, if it is assumed that at full resolution the A/B reference is entirely composed of alternating black (A field) and white (B field) lines, a c structured downsampled reference would be composed of pixels that are approximately gray due to the mixing of the A and B pixels that occurs during filtering and downsampling. However, an a/b structured reference would have all black pixels for the a field and all white pixels for the b field because each field is filtered and downsampled separately. If the encoder decides to do a field prediction from the A field, a decoder with a c structured reference would read a prediction consisting of gray pixels. However, a decoder with an a/b structured reference would read a much more accurate prediction from the a field consisting of black pixels. Thus, the a/b structure avoids the field "mixing" in the decoder that occurs in the c structure.

The downconverting decoder of the present invention overcomes one or more of the problems inherent in the prior art.

SUMMARY OF THE INVENTION

In accordance with the present invention, a method of downconverting received frame and field coded DCT coefficient blocks to reconstructed pixel field blocks, wherein the frame and field coded DCT coefficient blocks have motion vectors associated therewith, comprises the following steps: a) converting the received frame coded DCT coefficient blocks to converted field coded DCT coefficient blocks and performing an IDCT on the converted field coded DCT coefficient blocks to produce residual or pixel field blocks; b) directly performing an IDCT on the received field coded DCT coefficient blocks to produce residual or pixel field blocks; c) selecting reference pixel blocks based upon the motion vectors, upsampling the reference pixel blocks, and downsampling at least a portion of the upsampled reference blocks to form a prediction; and, d) adding the prediction to the residual field blocks to form reconstructed field blocks.

In a more detailed aspect of the present invention, an apparatus for downconverting received frame and field coded DCT coefficient blocks to reconstructed pixel field blocks comprises an IDCT and a motion compensator. The IDCT is arranged to convert the received frame coded DCT coefficient blocks to converted field coded DCT coefficient blocks and to perform an IDCT on the converted field coded DCT coefficient blocks and on the received field coded DCT coefficient blocks in order to produce downconverted pixel related field blocks. The motion compensator is arranged to apply motion compensation, as appropriate, to the downconverted pixel related field blocks in order to produce the reconstructed pixel field blocks.

In a further more detailed aspect of the present invention, an apparatus for downconverting received frame and field coded DCT coefficient blocks to downconverted pixel related field blocks comprises first and second IDCT's. The first IDCT is arranged to convert the received frame coded DCT coefficient blocks to converted field coded DCT coefficient blocks and to perform a downconverting IDCT on the converted field coded DCT coefficient blocks in order to produce first downconverted pixel related field blocks. The second IDCT is arranged to directly perform a downconverting IDCT on the received field coded DCT coefficient blocks in order to produce second downconverted pixel related field blocks.

BRIEF DESCRIPTION OF THE DRAWINGS

These and other features and advantages of the present invention will become more apparent from a detailed consideration of the invention when taken in conjunction with the drawings in which.

DETAILED DESCRIPTION

According to one embodiment of the present invention, reference pictures are stored with a predetermined vertical pixel structure regardless of whether the received DCT blocks are field or frame coded. For example, the reference pictures are always stored with the a/b vertical pixel structure shown in column 92 regardless of whether the received DCT blocks are field or frame coded. This consistent vertical pixel structure for the reference pictures allows both field and frame prediction with prediction upsampling to be done in a more straight forward manner because the pixel structure of the reference picture is always known.

Figure 1:
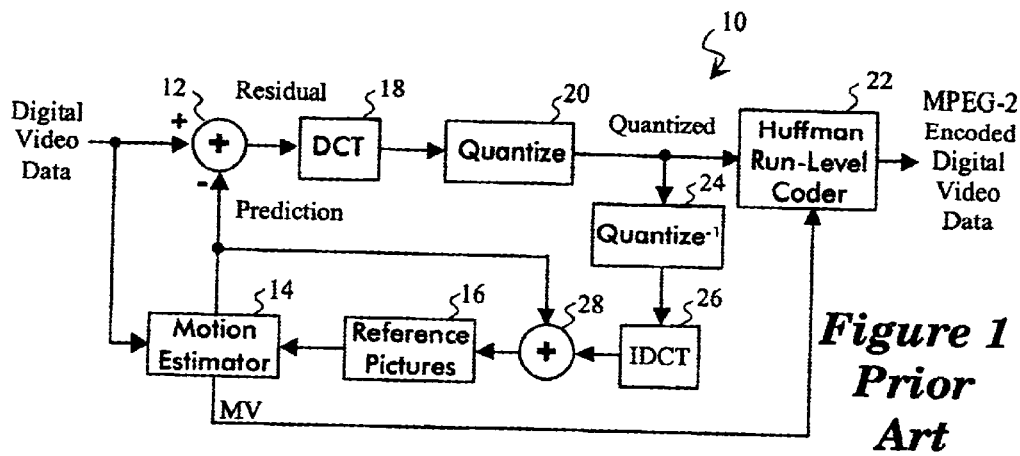
FIG. 1 is a simplified block diagram of a known MPEG-2 encoder.
Figure 2:
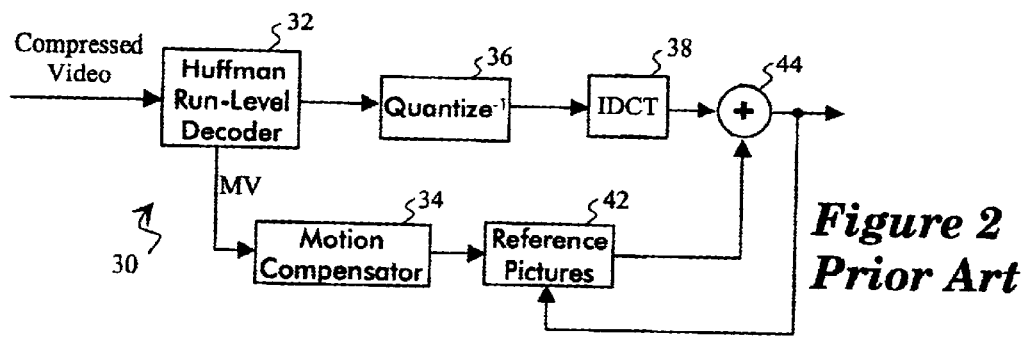
FIG. 2 is a simplified block diagram of a known MPEG-2 decoder.
Figure 3:
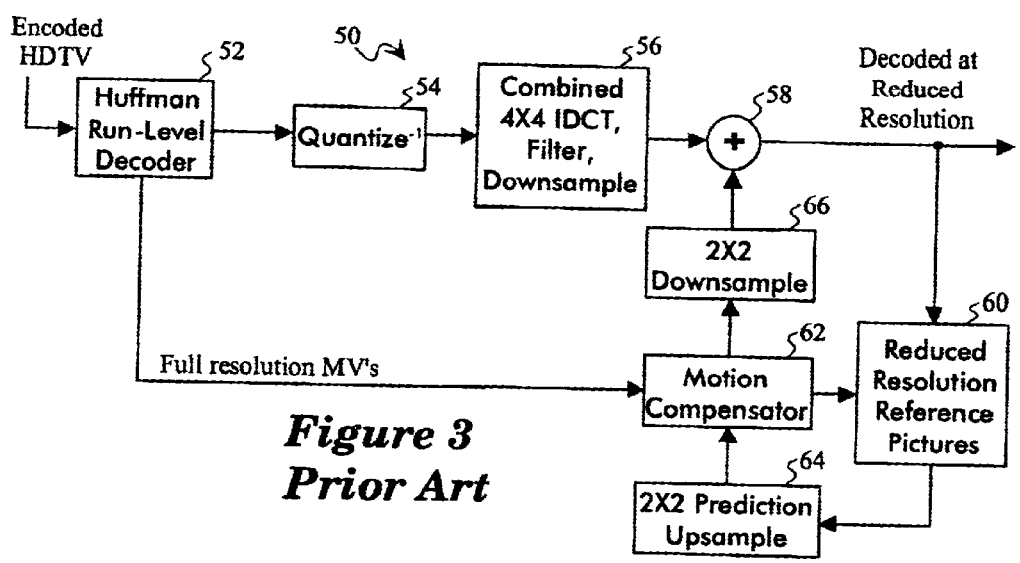
FIG. 3 is a block diagram of a known down conversion decoder for an HDTV application.
Figures 4, 5:
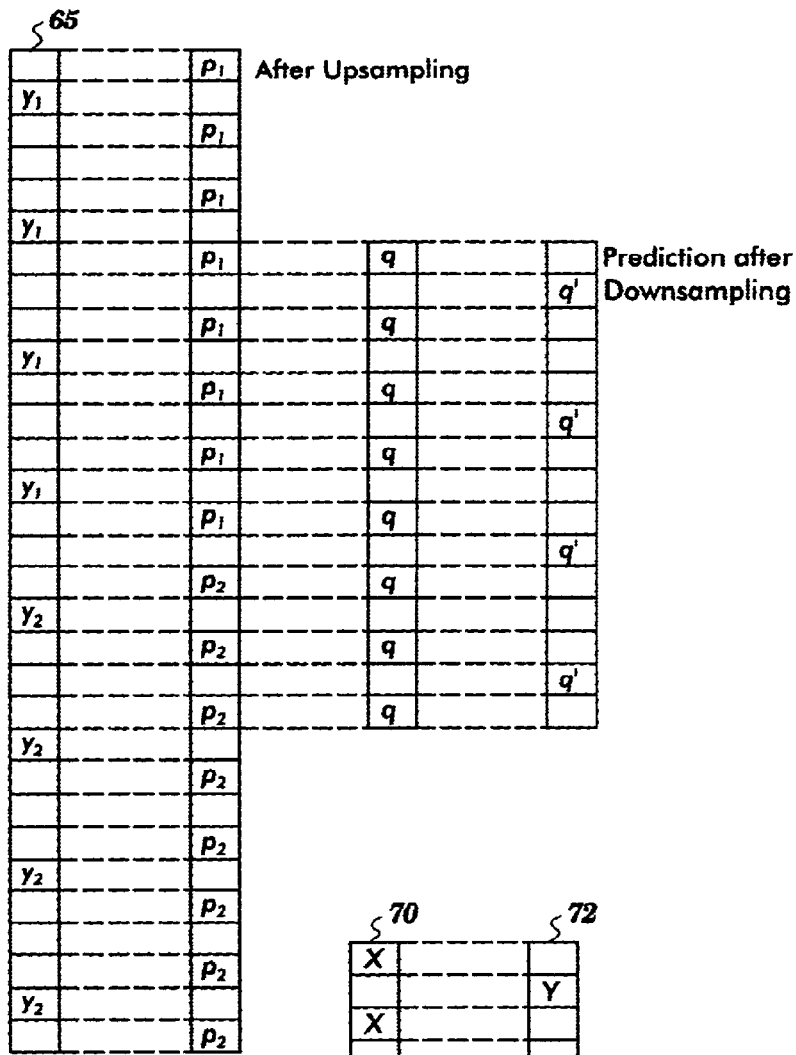
FIGS. 4–9 show exemplary sets of pixel data useful in describing the background of the present invention.
Figure 6:
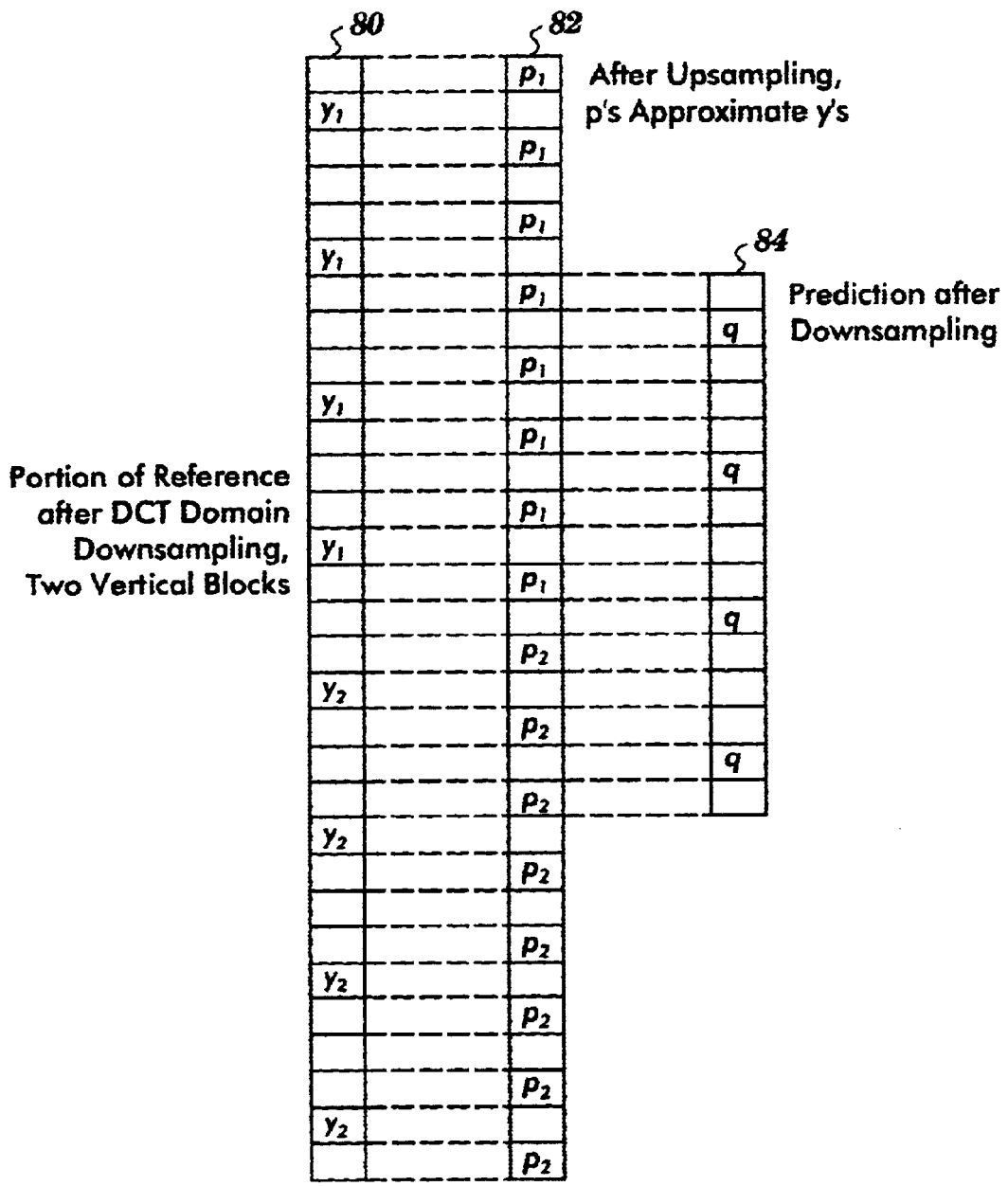
Figure 7:
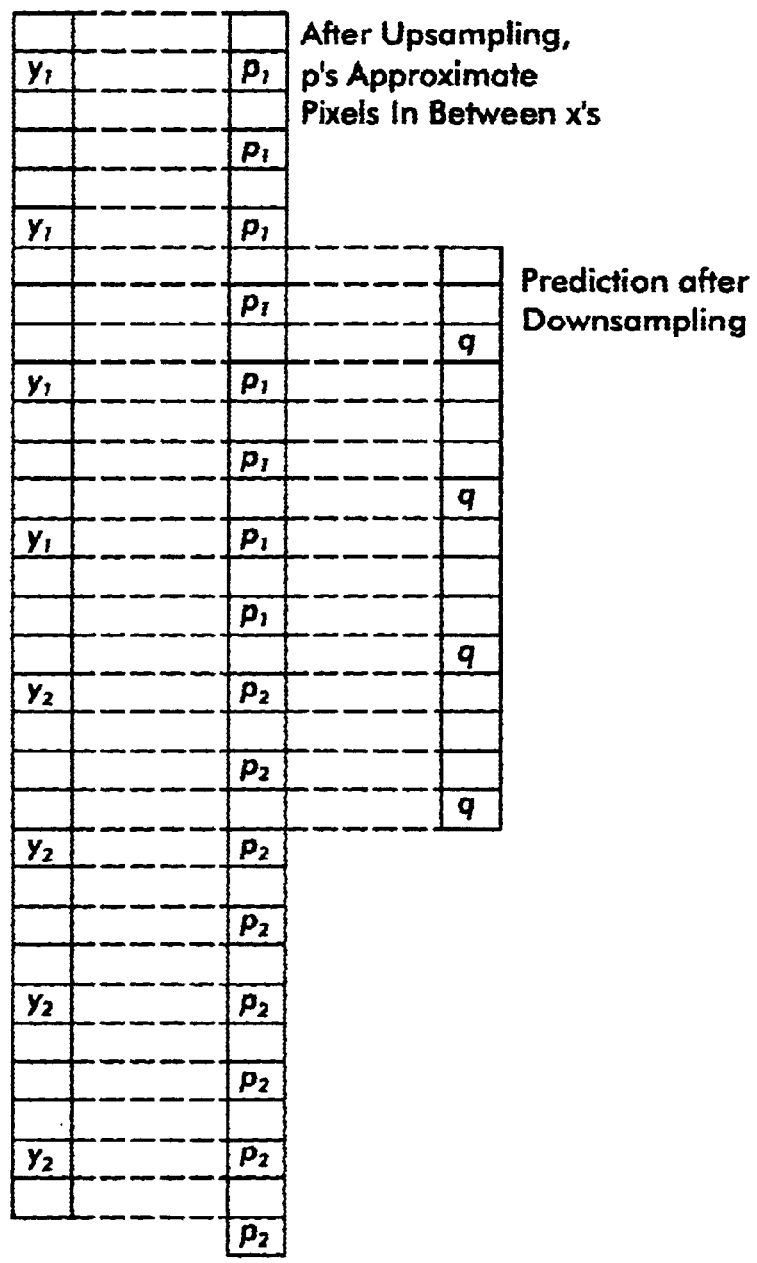
Figure 8:
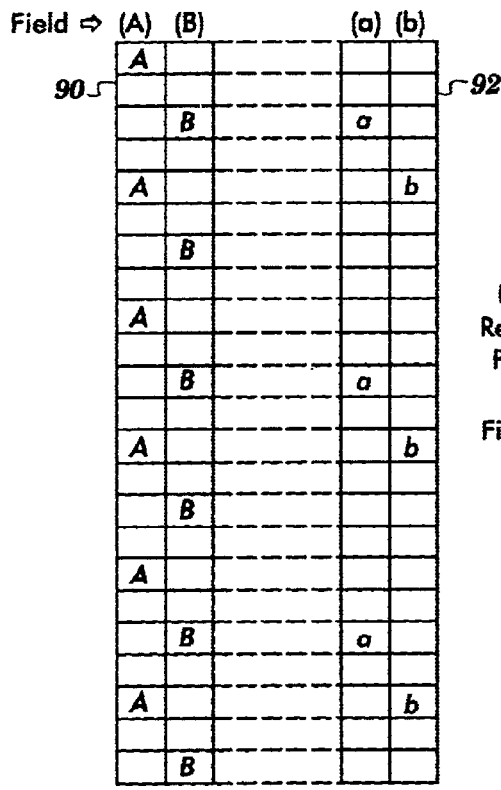
Figure 9:
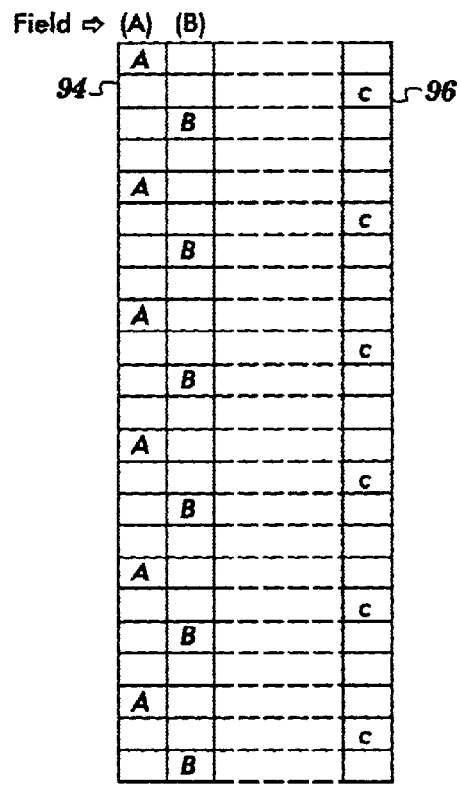
Figure 10:
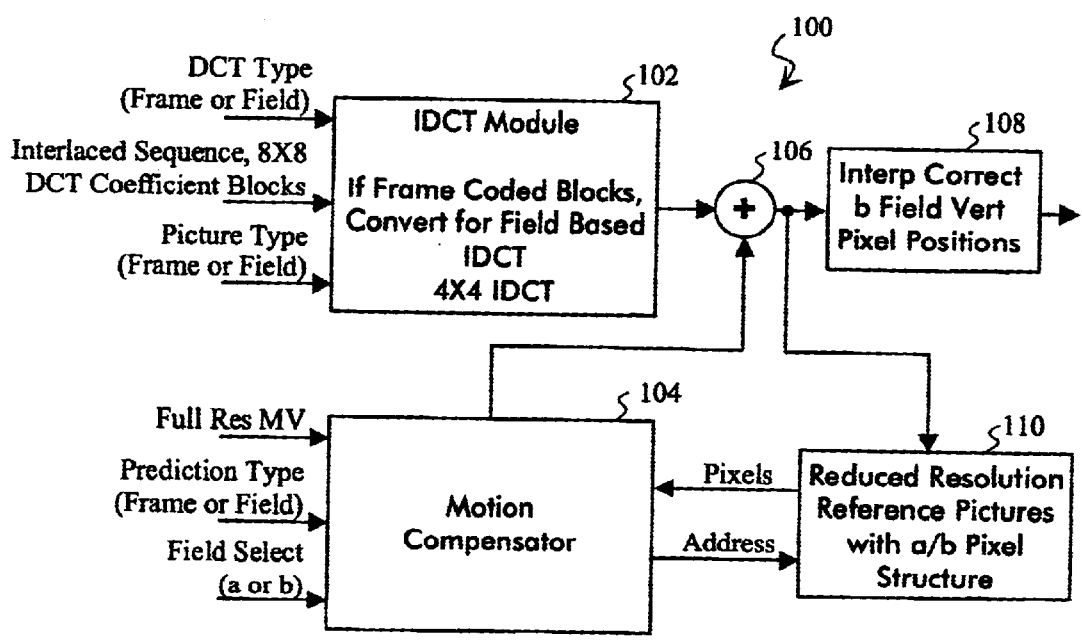
FIG. 10 is a block diagram of a downconverting decoder according to the present invention.

A downconverting decoder 100 according to an embodiment of the present invention is shown in FIG. 10. A Huffman and run/level decoder, data parser, and inverse quantizer (not shown), which are located upstream of the downconverting decoder 100, all operate as described above. The resulting DCT coefficient blocks from the Huffman and run/level decoder and the inverse quantizer are provided to an IDCT module 102 of the downconverting decoder 100. Other information, such as DCT type (frame or field) and picture type (frame or field) are provided to the IDCT module 102 from the data parser. The data parser also provides the motion vector, prediction type (frame or field), and field select signals to a motion compensator 104.

The IDCT module 102 converts frame DCT coded blocks to field DCT coded blocks and performs DCT domain filtering, downsampling, and inverse DCT. In the case of field DCT coded blocks, the IDCT module 102 merely performs DCT domain filtering, downsampling, and inverse DCT. The residual pixel and intra pixel output of the IDCT module 102 has an a or b field structure and is fed to an adder 106. For the case of residual pixels, the other input of the adder 106 receives predicted pixels from the motion compensator 104. The output of the adder 106 consists of reconstructed blocks of field pixels which are provided to an interpolation module 108 and to a reference picture memory 110. The interpolation module 108 does a position adjust on the b field pixels for correct display. The field pixel blocks (for I and P pictures) are stored in the reference picture memory 110 for future predictions. The motion compensator 104 reads predicted pixel blocks from the reference picture memory 110 as required.

When frame pictures are received, the macroblocks of the frame pictures may be field or frame DCT coded. If a macroblock is frame DCT coded as indicated by the DCT type signal, the IDCT module 102 will convert the first two vertically stacked frame DCT coded blocks to two field DCT coded blocks and then perform a 4×4 IDCT on each of the two blocks. This process will be described below in greater detail and it will be shown that this process can be done in a very efficient manner. The same process is performed on the next two vertically stacked blocks in that macroblock. The result is as if the macroblock was originally field coded. However, if the macroblock is field DCT coded to begin with as indicated by the DCT type signal, then the IDCT module 102 just performs 4×4 IDCT's on each block in that macroblock. The result is that the output of the IDCT module 102 is always an a/b structured macroblock as shown in column 92 because the c structure shown in column 96 is avoided. Therefore, reference pictures will always be stored with the a/b pixel structure, which simplifies prediction upsampling.

When field pictures are received, the macroblocks of the field pictures input to the IDCT module 102 will always be field coded. The output of the IDCT module 102 will be either an a or a b structured macroblock.

As explained above in the discussion of prior art, the motion compensator with prediction upsampler/downsampler filter should use the motion vector to select an area from the reference picture memory that includes the blocks overlapped by the desired predicted macroblock. This area is then upsampled to full resolution (including ½ pixel interpolation if required). Then the motion vector is used to select the full resolution predicted macroblock. The full resolution predicted macroblock is then filtered and downsampled to match the structure of the 4×4 IDCT residual output. This process can be done in three steps, or can be implemented as a single step. Horizontally, this process is the same as in the prior art. Vertically, the motion compensator 104 must support two types of prediction upsampling/downsampling. These two types are field prediction and frame prediction, and are indicated by the prediction type signal.

Figure 11:
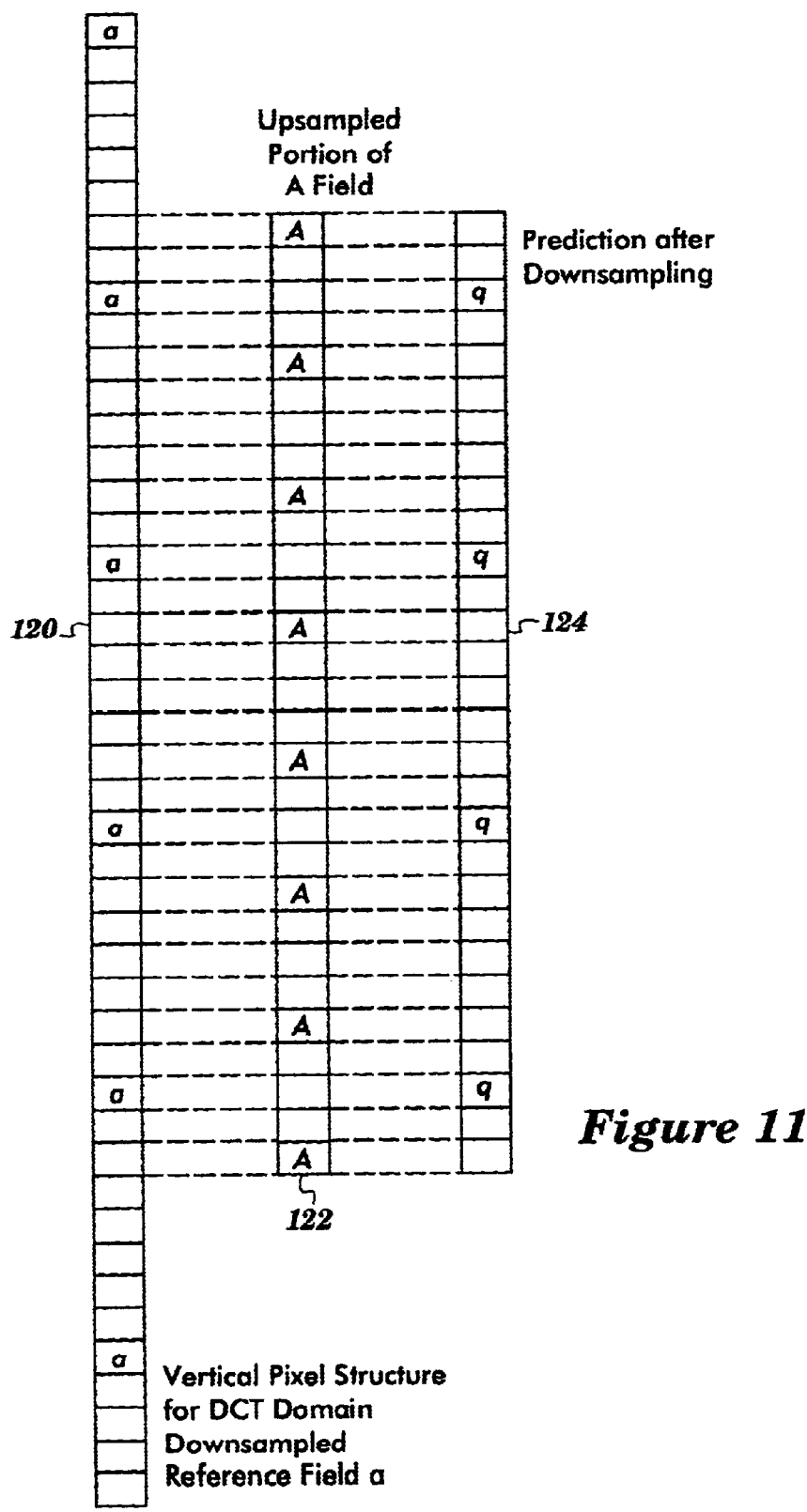
FIGS. 11–14 show additional exemplary sets of pixel data useful in describing the present invention.

Field Prediction—When the prediction type signal indicates field such that field prediction from an a or b reference field is required, the motion vector is used to read pixels from a particular area of a downsampled reference field a or b. Then, a prediction upsampling/downsampling filter (Mokry or Johnson or similar type) operates horizontally and then vertically on these pixels to form a predicted field macroblock. This operation is shown in FIG. 11 with respect to a downsampled reference field a. Column 120 of FIG. 11 represents a DCT domain downsampled reference field a as stored in the reference picture memory 110. Column 122 represents an upsampled portion of this reference field, and column 124 represents the prediction after downsampling.

Figure 12:
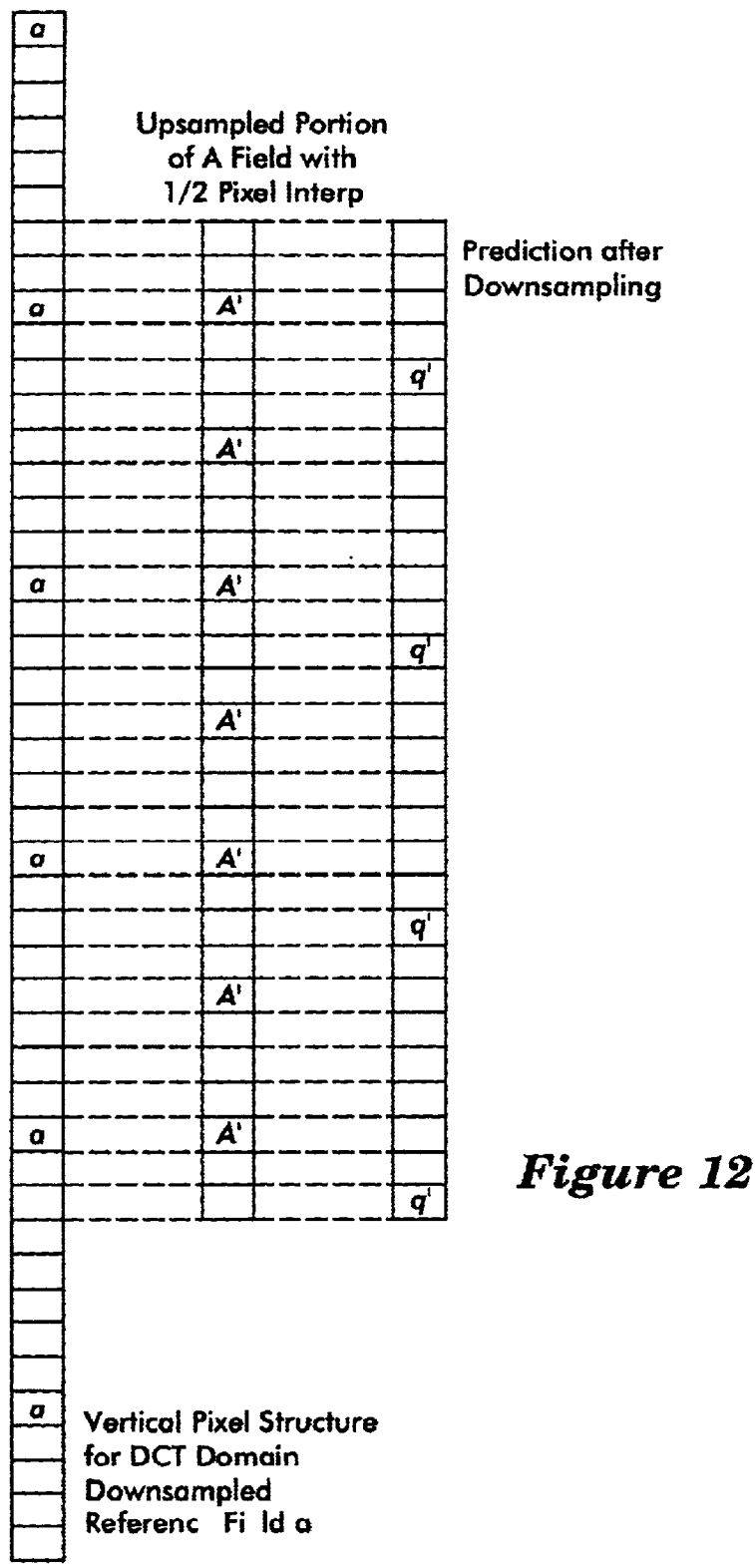

The upsampling/downsampling filter may include additional ½ pixel interpolation if the motion vector is fractional. FIG. 12 shows an example of vertical upsampling/downsampling from a reference field a when ½ pixel interpolation is implemented.

It should be noted that, in the case of frame pictures, there will be two field predictions for each macroblock utilizing two motion vectors. One field prediction is for the A field, and one prediction is for the B field. Each field prediction is operated upon separately by the prediction upsampling/downsampling filter, including additional ½ pixel interpolation if the motion vector is fractional.

Figure 13:
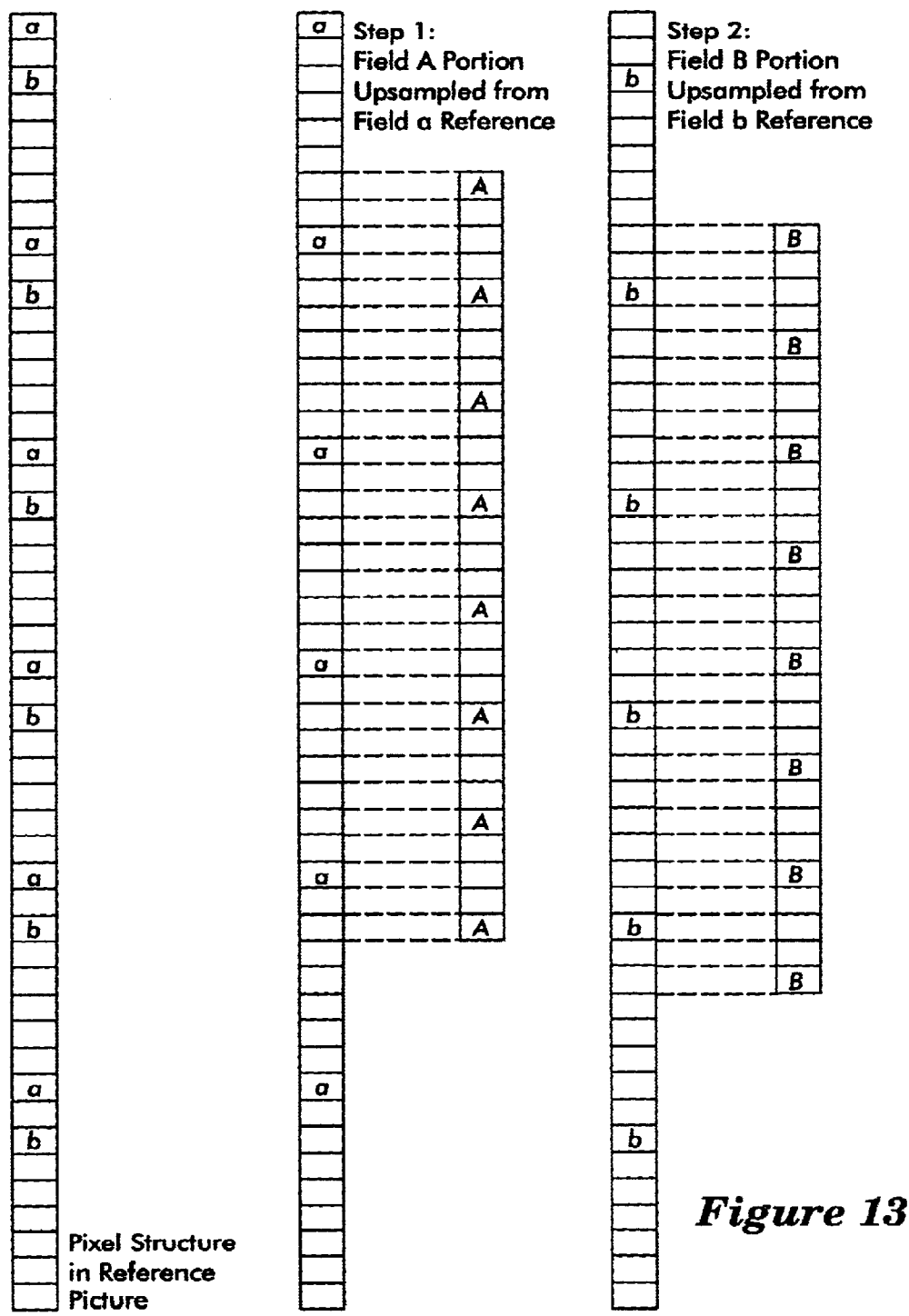
Figure 14:
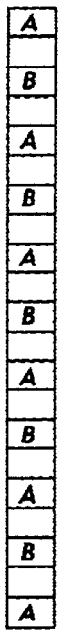
Figure 14:
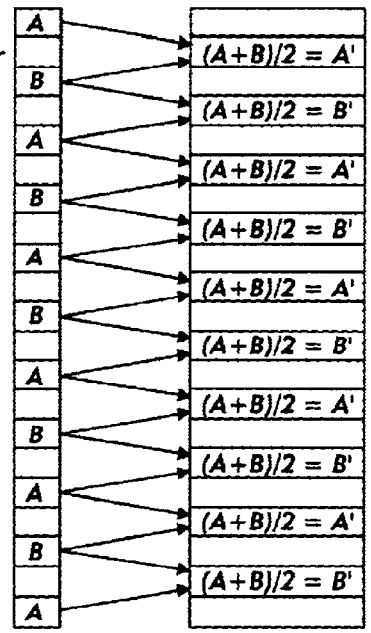
Figure 14:
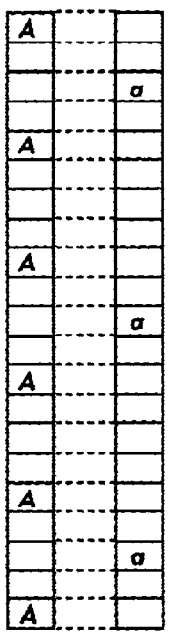
Figure 14:
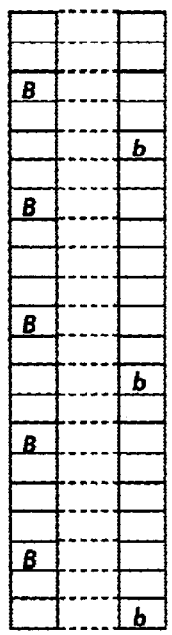
Figure 14:
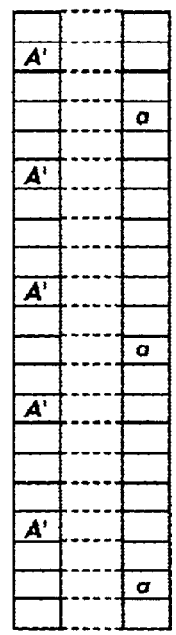
Figure 14:
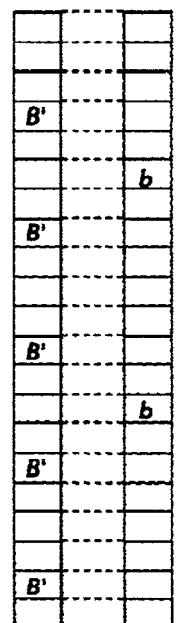

Frame Prediction—Frame prediction is required from an a/b reference picture for a frame DCT coded residual macroblock. Due to operation of the IDCT module 102, the residual macroblock output from the IDCT module 102 has the a/b structure. The motion vector for the macroblock is used to read a particular area from the a/b structured downsampled reference picture stored in the reference picture memory 110. Horizontal prediction upsampling/downsampling is done as in the case of field prediction. Vertical prediction upsampling/downsampling must be broken up into separate steps. The a and b fields from the read area are separately vertically upsampled (here, both ½ pixel interpolation and subsequent downsampling are postponed to a later step) in order to approximate the full resolution A and B fields which are shown by steps 1 and 2 of FIG. 13. If the motion vector is fractional, ½ pixel interpolation is performed as follows. The A and B upsampled field areas are line shuffled (see step 3 of FIG. 14). Then ½ pixel vertical interpolation is performed as shown by step 4 of FIG. 14 in order to create A'/B' upsampled field areas. This process matches how the encoder does ½ pixel interpolation on frame coded macroblocks. It would not be correct to perform ½ pixel interpolation separately on the fields. Finally, the A and B (or A' and B') portions of the upsampled prediction are separately filtered and downsampled to create a prediction for the a/b structured residual macroblock (see step 5 of FIG. 14). It should be noted that, unlike the situation for field prediction, the frame prediction upsample/downsample process must be split into separate filtering steps.

Figure 15:
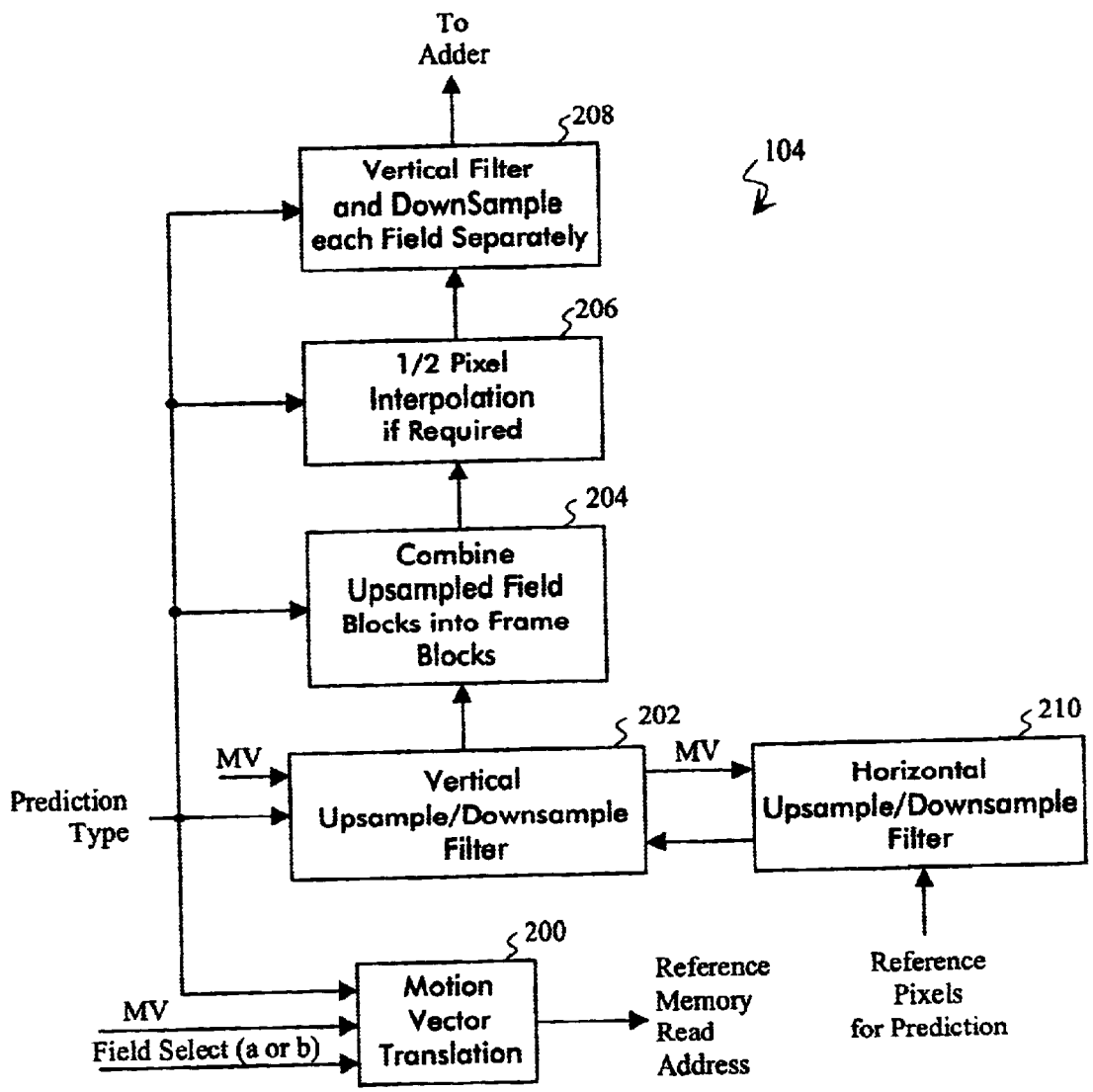
FIG. 15 shows a block diagram of a motion compensator of FIG. 9 in additional detail.

The motion compensator 104 is shown in more detail in FIG. 15. The motion compensator 104 executes the two required types of prediction upsampling/downsampling based on the prediction type signal (field or frame). The prediction type signal is distributed to a motion vector translator 200, to a vertical upsample/downsample filter 202, to a combiner 204, to an interpolator 206, and to a vertical filter and downsampler 208. The motion vector translator 200 also accepts the motion vector from the data parser as an input. The motion vector translator 200 translates the motion vector to a series of reference memory addresses in order to read pixels stored in the reference picture memory 110 from reference fields a and b when the prediction type is for frame prediction, or from a reference field a or a reference field b (as indicated by the field select signal) when the prediction type indicates field prediction.

The pixels that are read out from the reference picture memory 110 are provided to a horizontal upsample/downsample filter 210. The horizontal upsample/downsample filter 210 executes a horizontal prediction upsampling/downsampling filtering operation as previously described, including ½ pixel interpolation if the motion vector is fractional. The horizontally processed pixels are then provided to the vertical upsample/downsample filter 202. If the type of prediction is field prediction, the vertical upsample/downsample filter 202 executes vertical upsampling/downsampling, with additional ½ pixel interpolation if the motion vector is fractional. The combiner 204, the interpolator 206, and the vertical filter and downsampler 208 simply pass through the output of the vertical upsample/downsample filter 202 during field prediction.

For frame prediction, however, the vertical upsample/downsample filter 202 performs only vertical upsampling on the horizontally processed pixels provided by the horizontal upsample/downsample filter 210. In this case, ½ pixel prediction (if necessary) and downsampling are executed later.

The combiner 204 operates only during frame prediction and when the motion vector is vertically fractional by line shuffling the upsampled A and B field blocks. If the prediction type is frame and if the motion vector is vertically fractional, the interpolator 206 executes ½ pixel linear vertical interpolation. If the prediction type is frame, the vertical filter and downsampler 208 separately filters and downsamples the A and B (or A' and B') fields. The output of the vertical filter and downsampler 208 is the desired prediction. Accordingly, the combiner 204 and the interpolator 206 operate only when there is frame prediction and the motion vector is fractional, and the vertical filter and downsampler 208 operates only when there is frame prediction. When there is field prediction, the combiner 204, the interpolator 206, and the vertical filter and downsampler 208 simply pass through the output of the vertical upsample/downsample filter 202.

Figure 16:
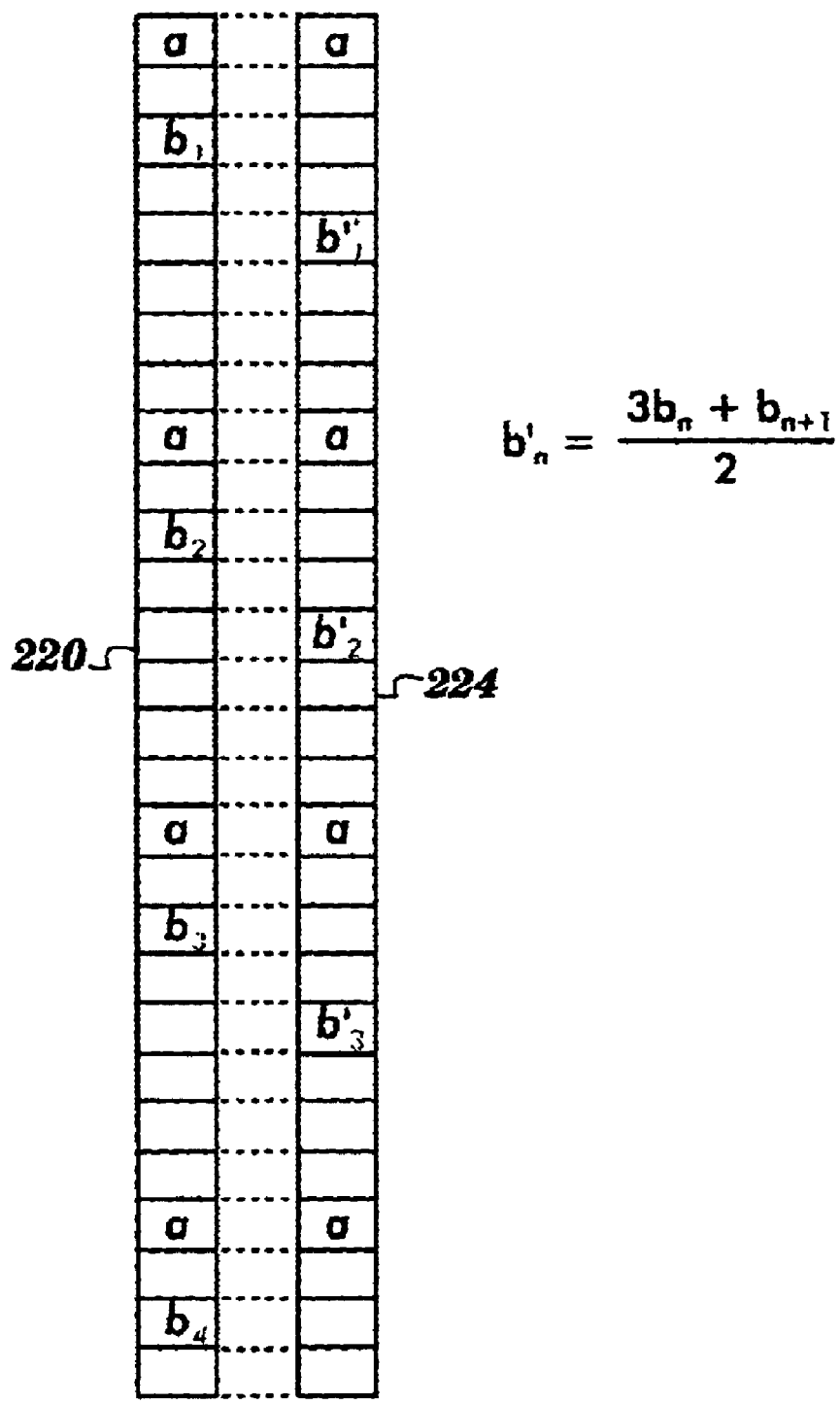
FIG. 16 shows an additional exemplary set of pixel data useful in describing the present invention.

The b field pixels at the output of the adder 106 of FIG. 10 do not fall directly in between the a field pixels, as shown by column 220 of FIG. 16. Accordingly, the interpolation module 108 performs a simple linear interpolation, as shown in FIG. 16, so that the b field pixels are repositioned halfway in between the a field pixels, as shown in column 224. Accordingly, the b field pixels will be properly displayed. Alternatively, a longer FIR filter with an even number of taps could be used.

The IDCT module 102 of FIG. 10 is described in additional detail subsequently to the following mathematical derivation. This mathematical derivation discloses an efficient method of converting two vertically stacked frame coded 8×8 blocks of DCT coefficients into two blocks of field DCT coefficients which are then vertically inverse discrete cosine transformed by a four point IDCT operation that effectively vertically filters and downsamples the blocks as separate fields resulting in an a/b spatial pixel structure. This mathematical derivation demonstrates that the vertical processing can be done efficiently in a single matrix operation. This derivation is first shown one dimensionally for a single column of sixteen pixels (two vertically stacked one dimensional "blocks") and is then shown for two dimensional blocks of multiple columns. With respect to this derivation, an uppercase X refers to frequency domain DCT coefficients and a lowercase x or y refers to spatial domain pixels or residual values.

First, the following equation provides an initial definition:

$$\begin{bmatrix} \begin{bmatrix} X \\ X \\ X \\ X \\ X \\ X \\ X \\ X \end{bmatrix} \\ \begin{bmatrix} X \\ X \\ X \\ X \\ X \\ X \\ X \\ X \end{bmatrix} \end{bmatrix} = [X] \quad (1)$$

where the left hand side of equation (1) comprises two one dimensional vertical blocks each containing eight frame DCT coefficients. An 8×8 DCT matrix [T8] is defined by the following equation:

$$[T8] = \begin{bmatrix} t00 & t01 & t02 & t03 & t04 & t05 & t06 & t07 \\ t10 & t11 & t12 & t13 & t14 & t15 & t16 & t17 \\ t20 & t21 & t22 & t23 & t24 & t25 & t26 & t27 \\ t30 & t31 & t32 & t33 & t34 & t35 & t36 & t37 \\ t40 & t41 & t42 & t43 & t44 & t45 & t46 & t47 \\ t50 & t51 & t52 & t53 & t54 & t55 & t56 & t57 \\ t60 & t61 & t62 & t63 & t64 & t65 & t66 & t67 \\ t70 & t71 & t72 & t73 & t74 & t75 & t76 & t77 \end{bmatrix} \quad (2)$$

where the rows of the right hand side of equation (2) contain the well known values for the eight point DCT basis vectors. Further, an IDCT operator $[IT8_2]$ (where IT represents inverse transform) for two vertically stacked blocks is derived from equation (2) according to the following equation:

$$[IT8_2] = \begin{bmatrix} T8^T & 0 \\ 0 & T8^T \end{bmatrix} \quad (3)$$

Equations (1) and (3) can be combined as follows:

$$[IT8_2][X] = \begin{bmatrix} \begin{bmatrix} x \\ x \\ x \\ x \\ x \\ x \\ x \\ x \end{bmatrix} \\ \begin{bmatrix} x \\ x \\ x \\ x \\ x \\ x \\ x \\ x \end{bmatrix} \end{bmatrix} = [x] \quad (4)$$

where the two blocks [x] on the right hand side of equation (4) are in the spatial domain. Next, a matrix $[T_f]$ may be defined, based on equation (2), according to the following equation:

$$[T_f] = \begin{bmatrix} \begin{bmatrix} t00 & 0 & t01 & 0 & t02 & 0 & t03 & 0 & t04 & 0 & t05 & 0 & t06 & 0 & t07 & 0 \\ t10 & 0 & t11 & 0 & t12 & 0 & t13 & 0 & t14 & 0 & t15 & 0 & t16 & 0 & t17 & 0 \\ t20 & 0 & t21 & 0 & t22 & 0 & t23 & 0 & t24 & 0 & t25 & 0 & t26 & 0 & t27 & 0 \\ t30 & 0 & t31 & 0 & t32 & 0 & t33 & 0 & t34 & 0 & t35 & 0 & t36 & 0 & t37 & 0 \\ t40 & 0 & t41 & 0 & t42 & 0 & t43 & 0 & t44 & 0 & t45 & 0 & t46 & 0 & t47 & 0 \\ t50 & 0 & t51 & 0 & t52 & 0 & t53 & 0 & t54 & 0 & t55 & 0 & t56 & 0 & t57 & 0 \\ t60 & 0 & t61 & 0 & t62 & 0 & t63 & 0 & t64 & 0 & t65 & 0 & t66 & 0 & t67 & 0 \\ t70 & 0 & t71 & 0 & t72 & 0 & t73 & 0 & t74 & 0 & t75 & 0 & t76 & 0 & t77 & 0 \end{bmatrix} \\ \begin{bmatrix} 0 & t00 & 0 & t01 & 0 & t02 & 0 & t03 & 0 & t04 & 0 & t05 & 0 & t06 & 0 & t07 \\ 0 & t10 & 0 & t11 & 0 & t12 & 0 & t13 & 0 & t14 & 0 & t15 & 0 & t16 & 0 & t17 \\ 0 & t20 & 0 & t21 & 0 & t22 & 0 & t23 & 0 & t24 & 0 & t25 & 0 & t26 & 0 & t27 \\ 0 & t30 & 0 & t31 & 0 & t32 & 0 & t33 & 0 & t34 & 0 & t35 & 0 & t36 & 0 & t37 \\ 0 & t40 & 0 & t41 & 0 & t42 & 0 & t43 & 0 & t44 & 0 & t45 & 0 & t46 & 0 & t47 \\ 0 & t50 & 0 & t51 & 0 & t52 & 0 & t53 & 0 & t54 & 0 & t55 & 0 & t56 & 0 & t57 \\ 0 & t60 & 0 & t61 & 0 & t62 & 0 & t63 & 0 & t64 & 0 & t65 & 0 & t66 & 0 & t67 \\ 0 & t70 & 0 & t71 & 0 & t72 & 0 & t73 & 0 & t74 & 0 & t75 & 0 & t76 & 0 & t77 \end{bmatrix} \end{bmatrix} \quad (5)$$

where the rows of equation (5) are the eight point DCT basis vectors with zero's placed between each coefficient.

Equations (4) and (5) can be combined according to the following equation:

$$[T_f][x] = \begin{bmatrix} \begin{bmatrix} Xa \\ Xa \\ Xa \\ Xa \\ Xa \\ Xa \\ Xa \\ Xa \end{bmatrix} \\ \begin{bmatrix} Xb \\ Xb \\ Xb \\ Xb \\ Xb \\ Xb \\ Xb \\ Xb \end{bmatrix} \end{bmatrix} = [Xab] \quad (6)$$

where [x] is frame ordered, but where [Xab] comprises two field DCT coded blocks for fields a and b.

Accordingly, frame DCT coefficients [X] can be converted to field DCT coded coefficients [Xab] in a single operation according to the following equation:

$$[Xab] = [T_f][x] = [T_f][IT8_2][X] = [Q_1][X] \quad (7)$$

where $[Q_1]$ is an operator given by the following equation:

$$[Q_1] = [T_f][IT8_2] \quad (8)$$

The frame DCT coded coefficients [X] can be converted to two separate field blocks [xab] in the spatial domain according to the following equation:

$$[xab] = [IT8_2][Xab] = [IT8_2][T_f][IT8_2][X] = [Q_2][X] \quad (9)$$

where $Q_2$ is a 16×16 matrix operator according to the following expression: $[Q_2] = [IT8_2][T_f][IT8_2]$. The quantity [xab] is also given by the following equation:

$$[IT8_2][Xab] = \begin{bmatrix} xa \\ xa \\ xa \\ xa \\ xa \\ xa \\ xa \\ xa \\ xb \\ xb \\ xb \\ xb \\ xb \\ xb \\ xb \\ xb \end{bmatrix} = [xab] \quad (10)$$

where [xab] comprises two separate field blocks.

The matrix $[IT8_2]$ can be modified so that downsampling and filtering can be added. Thus, an 8×8 matrix [P4] can be formed from a 4×4 DCT basis matrix [T4] by padding the well known four point DCT basis vectors with zero's in both direction according to the following equations:

$$[T4] = \begin{bmatrix} r00 & r01 & r02 & r03 \\ r10 & r11 & r12 & r13 \\ r20 & r21 & r22 & r23 \\ r30 & r31 & r32 & r33 \end{bmatrix} \quad (11)$$

$$[P4] = \begin{bmatrix} r00 & r01 & r02 & r03 & 0 & 0 & 0 & 0 \\ r10 & r11 & r12 & r13 & 0 & 0 & 0 & 0 \\ r20 & r21 & r22 & r23 & 0 & 0 & 0 & 0 \\ r30 & r31 & r32 & r33 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \Big/ \sqrt{2} \quad (12)$$

Then, the transpose of equation (12) may be applied to a column of eight pixels according to the following equation:

$$[P4^T] = \begin{bmatrix} X \\ X \\ X \\ X \\ X \\ X \\ X \\ X \end{bmatrix} = \begin{bmatrix} y \\ y \\ y \\ y \\ 0 \\ 0 \\ 0 \\ 0 \end{bmatrix} \quad (13)$$

where the y's on the right hand side of equation (13) are the filtered and downsampled spatial pixels resulting from the inverse DCT operation on the left hand side of equation 13. Only the four pixels y need to be retained such that the zero's on the right hand side of equation (13) may be discarded. These pixels y represent a filtered and downsampled version of an original eight pixel block [x]. A matrix [IP4$_2$], which is an operator for two vertical blocks, may be established according to the following equation:

$$[IP4_2] = \begin{bmatrix} P4^T & 0 \\ 0 & P4^T \end{bmatrix} \quad (14)$$

where the matrix [IP4$_2$] is a filter/downsample/IDCT operator. The operator [IT8$_2$] which is used to perform an IDCT on [X] to produce [x], the operator [T$_f$] which is used to perform a field split in order to produce [Xab], and the operator [IP4$_2$] which performs filtering, downsampling, and an IDCT separately on each field to derive [y] can be combined according to the following equation so that two vertical blocks of frame DCT coded coefficients can be filtered, downsampled, and inverse discreet cosine transformed in a single operation:

$$[Q_3] = [IP4_2][T_f][IT8_2] \quad (15)$$

Thus, by applying the operator [Q$_3$], which is a 16×16 operator, to two vertical blocks of DCT coded coefficients given by equation (1), the following results are produced:

$$[Q_3][X] = \begin{bmatrix} \begin{bmatrix} ya \\ ya \\ ya \\ ya \\ 0 \\ 0 \\ 0 \\ 0 \end{bmatrix} \\ \begin{bmatrix} yb \\ yb \\ yb \\ yb \\ 0 \\ 0 \\ 0 \\ 0 \end{bmatrix} \end{bmatrix} \quad (16)$$

The zero's on the right hand of equation (16) can be discarded so that only the ya's and yb's are retained. The output, therefore, of applying the operator [Q$_3$] to two frame DCT coded blocks is separate top and bottom field blocks for fields a and b, each separately filtered and downsampled effectively using a 4×4 IDCT operating on field DCT coded blocks.

Because [Q$_3$] has the following form:

$$\begin{bmatrix} [p] \\ [0] \\ [q] \\ [0] \end{bmatrix} \quad (17)$$

the operator [Q$_3$] can be rewritten in the following form:

$$Q_3 = \begin{bmatrix} [p] \\ [q] \end{bmatrix} \quad (18)$$

where [p] and [q] are each 4×16 matrices. Accordingly, the operator [Q$_3$] becomes an 8×16 operator instead of a 16×16 operator so that, when it is applied to two frame DCT coded blocks, only the ya's and yb's of equation (16) results.

The following description shows how the operator [Q$_3$] may be used on two dimensional blocks having eight columns, and also shows the horizontal IDCT with filtering and downsampling. For a full two dimensional field based 4×4 IDCT of frame DCT coded blocks, the [Q$_3$] operation is only performed vertically. A standard four point IDCT is performed horizontally. Let X be a macroblock consisting of four frame coded 8×8 DCT blocks $X_1$, $X_2$, $X_3$, and $X_4$. Spatially, these 8×8 DCT coded blocks are oriented as follows:

$X_1$ $X_2$
$X_3$ $X_4$

As a first step, the high order horizontal coefficients of each of the 8×8 DCT coded blocks $X_1$, $X_2$, $X_3$, and $X_4$ are discarded (the four high order coefficients in each row) so that each DCT block becomes an 8×4 block ($X_1'$, $X_2'$, $X_3'$, and $X_4'$). A 16×4 matrix [$X_m$] may be used to define the two 8×4 frame coded DCT blocks $X_1'$ and $X_3'$ according to the following equation:

$$[X_m] = \begin{bmatrix} [X_1'] \\ [X_3'] \end{bmatrix} \quad (19)$$

and similarly a 16×4 matrix [$X_n$] may be used to define the frame coded 8×4 DCT blocks $X_2'$ and $X_4'$ according to the following equation:

$$[X_n] = \begin{bmatrix} [X_2'] \\ [X_4'] \end{bmatrix} \quad (20)$$

At this point, the vertical operation can be performed first, followed by the horizontal operation, or the horizontal operation may be performed first followed by the vertical operation. Assuming that the vertical operation is performed first; field based DCT domain vertical filtering and downsampling is performed according to the following equation:

$$[G] = [Q_3][X_m] = \begin{bmatrix} [G_a] \\ [G_b] \end{bmatrix} \quad (21)$$

where [G] is an 8×8 matrix, [Q$_3$] is an 8×16 matrix, [$X_m$] is the 16×4 matrix described above, and [$G_a$] and [$G_b$] are 4×4 matrices for corresponding fields a and b. Then, horizontal DCT domain filtering and downsampling is performed according to the following equation:

$$\begin{bmatrix}[ya]\\ [yb]\end{bmatrix} = \begin{bmatrix}[Ga]\\ [Gb]\end{bmatrix}\frac{[T4]}{\sqrt{2}} \qquad (22)$$

where [ya] and [yb] are each a 4×4 matrix, where [Ga] and [Gb] are the 4×4 matrices derived from equation (21), where the ya and yb are the resulting residual or pixel values provided by the IDCT module 102 to the adder 106, and where [T4] is the four point DCT basis vector 4×4 matrix from equation (11). These operations represented by equations (21) and (22) are also applied thereafter to the 16×4 array [$X_n$].

On the other hand, the order of the above operations can be reversed in the case of first performing horizontal downsampling, followed by vertical downsampling with the same results. Thus, the four point DCT basis vector matrix T4 is applied to the 8×4 array [$X_1'$] and the 8×4 array [$X_3'$] according to the following equations:

$$[G_1] = \frac{[X_1']}{\sqrt{2}}[T4] \qquad (23)$$

$$[G_2] = \frac{[X_3']}{\sqrt{2}}[T4] \qquad (24)$$

The results [$G_1$] and [$G_2$] can be combined according to the following equation:

$$[G] = \begin{bmatrix}[G_1]\\ [G_2]\end{bmatrix} \qquad (25)$$

Thereafter, a vertical field based operation may be performed according to the following equation:

$$\begin{bmatrix}[ya]\\ [yb]\end{bmatrix} = [Q3]\begin{bmatrix}[G_1]\\ [G_2]\end{bmatrix} \qquad (26)$$

Figure 17:
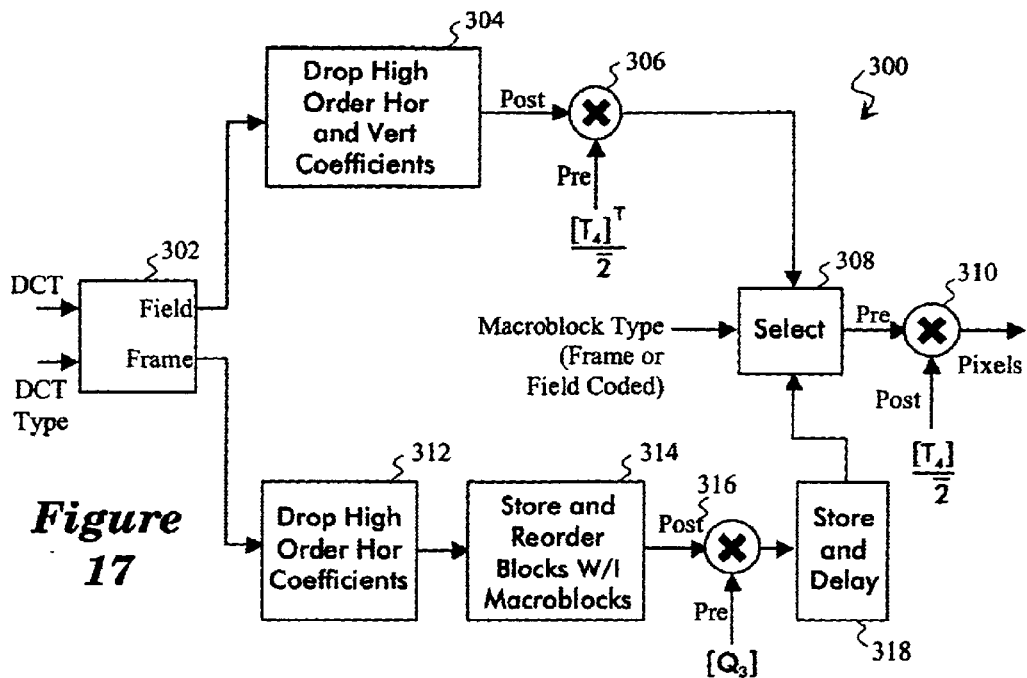
FIG. 17 shows an embodiment of an IDCT module of FIG. 9.

FIG. 17 shows an exemplary hardware implementation of an IDCT 300 which can be used for the IDCT module 102 of FIG. 10. The IDCT 300 processes both field DCT and frame DCT coded macroblocks. The output of the IDCT 300 is always a or b structured pixels. For field DCT coded blocks, the usual 4×4 IDCT is executed to achieve horizontal and vertical filtering and downsampling. For frame DCT coded blocks, the horizontal processing is the same, but vertically the $Q_3$ operator is used to effectively convert the frame coding to field coding, and then to filter and downsample each field separately. The result is a or b structured field blocks in either case.

It is noted here that matrix multiplication is not commutative (a*b does not in general equal b*a). Therefore, each matrix multiplier of the IDCT 300 has a pre and a post input to indicate the order of the associated matrix multiplication.

A macroblock X consisting of four 8×8 DCT blocks $X_1$, $X_2$, $X_3$, and $X_4$ is received by a parser 302 which sends the DCT blocks along one path of the IDCT 300 if the DCT blocks are field coded blocks and sends the DCT blocks along a different path of the IDCT 300 if the DCT blocks are frame coded blocks. If the four 8×8 DCT blocks are field DCT coded blocks as signaled by a DCT type input to the parser 302, each block is fed to a discard module 304 which discards the high order horizontal and vertical coefficients in order to form a 4×4 field DCT coded block for each of the 8×8 DCT field coded blocks supplied to it. A matrix multiplier 306 executes a four point vertical IDCT on the columns of the blocks provided to it. The vertically processed 4×4 blocks are fed to a selector 308. Because the DCT type is field, the 4×4 blocks provided by the matrix multiplier 306 are selected for output to a matrix multiplier 310. The matrix multiplier 310 executes a four point horizontal IDCT on each row of the blocks supplied to it. The output of the matrix multiplier 310 is a 4×4 block of filtered and downsampled pixels for field a or b.

If a macroblock X consists of frame DCT coded blocks as signaled by the DCT type, the blocks of the macroblock are fed in turn by the parser 302 to a discard module 312 which discards the high order horizontal coefficients in order to form corresponding 8×4 frame DCT coded blocks. These 8×4 blocks $X_1'$, $X_2'$, $X_3'$, and $X_4'$ are provided to a reorder module 314 where these 8×4 blocks are stored and reordered and then provided as two 16×4 blocks $X_m$ ($X_1'$ and $X_3'$) and $X_n$ ($X_2'$ and $X_4'$). The 16×4 block $X_m$ is first fed to a matrix multiplier 316 which, using the $Q_3$ operator, applies vertical conversion, filtering, and downsampling to the field DCT coefficients. The output of the matrix multiplier 316 is an 8×4 block consisting of Ga and Gb. A store and delay module 318 then separately outputs the 4×4 blocks Ga and Gb to the selector 308. Because the current macroblock X being processed is of type frame, the selector 308 applies the 4×4 Ga and Gb blocks to the matrix multiplier 310 which, operating first on the 4×4 block Ga, executes a four point IDCT on each row of the block, and then subsequently processes the 4×4 block Gb in a similar fashion. The outputs of the matrix multiplier 310 are 4×4 blocks of filtered and downsampled pixels ya for the a field and yb for the b field.

Figure 18:
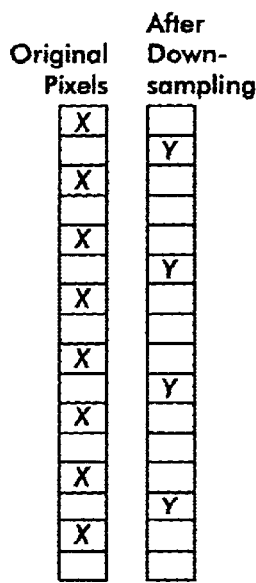
FIGS. 18–20 show an exemplary set of pixel data useful in describing an alternative embodiment of the present invention.

The IDCT module 102 can be modified in order to permit the elimination of the interpolation module 108. That is, the four point IDCT previously described involves the use of four point DCT basis vectors (the [T4] operator) on the four low order DCT coefficients originally derived from an eight point DCT operation in the encoder. This process results in the "in between" downsampled pixel positioning as previously described and as replicated in FIG. 18. In order to permit the elimination of the interpolation module 108, an alternative operator [T4'] can be derived.

Figure 19:
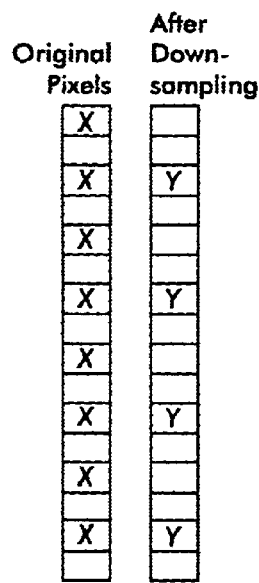
Figure 20:
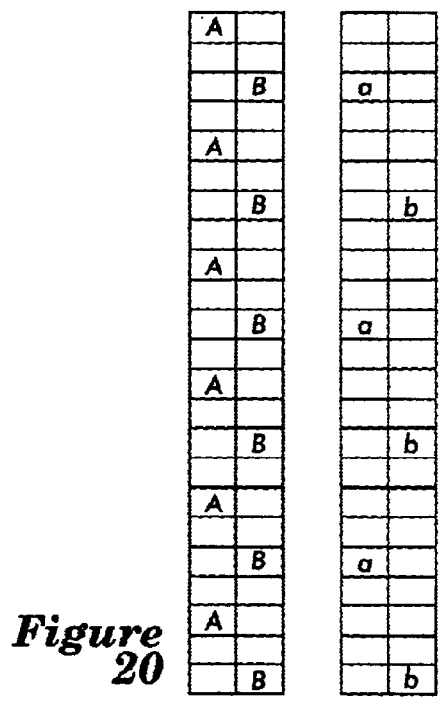

Thus, instead of consisting of the four point DCT basis vectors, the rows of the alternative operator [T4'] consist of downsampled eight point DCT basis vectors. If each row of the alternative operator [T4'] contains the second sample, the fourth sample, the sixth sample, and the eighth sample, respectively, of the four low order eight point DCT basis vectors, and if the decoder discards the four high order coefficients for each block and performs a four point IDCT on the remaining coefficients using the alternative operator [T4'], then the spatial relationship between the original pixels (x's) and the decoded pixels (y's) is shown in FIG. 19. Thus, if the [T4] operator is used to downsample the A field, and the alternative operator [T4'] is used to downsample the B field, then the resulting spatial relationship is shown in FIG. 20. It is noted that this is the desired relationship as shown by the column 224 of FIG. 16.

Therefore, it is desired to modify the IDCT module 102 so that its output always has the a/b pixel structure of FIG. 20. For field coded macroblocks of the A field, a four point IDCT (using the operator [T4]) is performed, as before. But for field coded macroblocks of the B field, the alternative operator [T4'] derived from the eight point basis vectors is used for IDCT.

For frame coded macroblocks, a modified operator. similar to the operator $Q_3$ must be derived that computes two separately downsampled fields directly from the frame coded coefficients. The modified operator $Q_3'$ must incorporate the operator [T4] for the A field and the alternative operator [T4'] for the B field. The operator [T4] is given by equation (11) and the operator [P4] is given by equation (12), where the DCT basis vectors r00, r01, ..., r33 are four point DCT basis vectors. The alternative operators [T4'] and [P4'] may be given by the following equations:

$$[T4'] = \begin{bmatrix} t01 & t03 & t05 & t07 \\ t11 & t13 & t15 & t17 \\ t21 & t23 & t25 & t27 \\ t31 & t33 & t35 & t37 \end{bmatrix} \quad (27)$$

$$[P4'] = \begin{bmatrix} t01 & t03 & t05 & t07 & 0 & 0 & 0 & 0 \\ t11 & t13 & t15 & t17 & 0 & 0 & 0 & 0 \\ t21 & t23 & t25 & t27 & 0 & 0 & 0 & 0 \\ t31 & t33 & t35 & t37 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (28)$$

where the DCT basis vectors t01, t03, ... t37 are eight point DCT basis vectors. The alternative operator [P4'] does not need the $\sqrt{2}$ scaling factor which is incorporated into the operator [P4] because the alternative operator [P4'] uses eight point basis vectors. Accordingly, the alternative operator [IP4'$_2$] is given by the following equation:

$$[IP4'_2] = \begin{bmatrix} P4^T & 0 \\ 0 & P4'^T \end{bmatrix} \quad (29)$$

where the operator [IP4'$_2$] is a filter/downsample/IDCT operator which clearly operates differently on the A field (using $P4^T$) than on the B field (using $P4'^T$).

A modified operator $Q_3'$, therefore, is defined according to the following equation:

$$[Q_3'] = [IP4'_2][T_F][IT8_2] \quad (30)$$

This modified operator $Q_3'$ is used by the IDCT module 102 instead of the operator $Q_3$ previously described. The IDCT module 102 using these appropriate operators results in an a/b pixel structure that eliminates the need for the interpolation module 108.

As previously stated, the use of a prediction upsampling filter should result in a close spatial domain approximation to the effective filtering operation performed by a 4×4 IDCT. Because the two fields are now filtered differently using the 4×4 IDCT, the two fields must be filtered differently by the motion compensator 104. The basic filter structure is the same for both fields, only the tap values differ. The tap values for both fields can easily be derived and stored in memory.

The following are representative values for the matrices [T8] and [T4]:

[T8]=
0.3536 0.3536 0.3536 0.3536 0.3536 0.3536 0.3536 0.3536
0.4904 0.4157 0.2778 0.0975 −0.0975 −0.2778 −0.4157 −0.4904
0.4619 0.1913 −0.1913 −0.4619 −0.4619 −0.1913 0.1913 0.4619
0.4157 −0.0975 −0.4904 −0.2778 0.2778 0.4904 0.0975 −0.4157
0.3536 −0.3536 −0.3536 0.3536 0.3536 −0.3536 −0.3536 0.3536
0.2778 −0.4904 0.0975 0.4157 −0.4157 −0.0975 0.4904 −0.2778
0.1913 −0.4619 0.4619 −0.1913 −0.1913 0.4619 −0.4619 0.1913
0.0975 −0.2778 0.4157 −0.4904 0.4904 −0.4157 0.2778 −0.0975

[T4]=
0.5000 0.5000 0.5000 0.5000
0.6533 0.2706 −0.2706 −0.6533
0.5000 −0.5000 −0.5000 0.5000
0.2706 −0.6533 0.6533 −0.2706

However, it should be understood that these values are merely exemplary and other values could be used.

Certain modifications of the present invention have been discussed above. Other modifications will occur to those practicing in the art of the present invention. For example, according to the description above, the interpolation module 108 can be eliminated through derivation of an alternative operator [T4'].

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of downconverting received frame and field coded DCT coefficient blocks to reconstructed pixel field blocks, wherein the frame and field coded DCT coefficient blocks have motion vectors associated therewith, the method comprising the following steps:

a) converting the received frame coded DCT coefficient blocks to converted field coded DCT coefficient blocks and performing an IDCT on the converted field coded DCT coefficient blocks to produce residual or pixel field blocks;

b) directly performing an IDCT on the received field coded DCT coefficient blocks to produce residual or pixel field blocks;

c) selecting reference pixel blocks based upon the motion vectors, upsampling the reference pixel blocks, and downsampling at least a portion of the upsampled reference blocks to form a prediction; and, d) adding the prediction to the residual field blocks to form reconstructed field blocks.

2. The method of claim 1 wherein step a) comprises the following steps:

a1) dropping high order DCT coefficients from the frame coded DCT coefficient blocks to produce downsized frame coded DCT coefficient blocks;

a2) reordering the downsized frame coded DCT coefficient blocks;

a3) converting the downsized frame coded DCT coefficient blocks to resulting field coded DCT coefficient blocks and performing an IDCT by columns on the resulting field coded DCT coefficient blocks; and, a4) separately performing an IDCT by rows on results from step a3).

3. The method of claim 2 wherein step a3) comprises the step of multiplying the resulting field coded DCT coefficient blocks by [Q3], wherein [Q3]=[IP4$_2$][T$_F$][IT8$_2$], wherein [IP4$_2$] is in the following form:

$$[IP4_2] = \begin{bmatrix} P4^T & 0 \\ 0 & P4^T \end{bmatrix}$$

wherein [P4] is in the following form:

$$[P4] = \begin{bmatrix} r00 & r01 & r02 & r03 & 0 & 0 & 0 & 0 \\ r10 & r11 & r12 & r13 & 0 & 0 & 0 & 0 \\ r20 & r21 & r22 & r23 & 0 & 0 & 0 & 0 \\ r30 & r31 & r32 & r33 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} / \sqrt{2}$$

wherein r00, r01, ... r33 are four point DCT basis vector, wherein [$T_f$] is in the following form:

$$[T_f] = \begin{bmatrix} \begin{bmatrix} t00 & 0 & t01 & 0 & t02 & 0 & t03 & 0 & t04 & 0 & t05 & 0 & t06 & 0 & t07 & 0 \\ t10 & 0 & t11 & 0 & t12 & 0 & t13 & 0 & t14 & 0 & t15 & 0 & t16 & 0 & t17 & 0 \\ t20 & 0 & t21 & 0 & t22 & 0 & t23 & 0 & t24 & 0 & t25 & 0 & t26 & 0 & t27 & 0 \\ t30 & 0 & t31 & 0 & t32 & 0 & t33 & 0 & t34 & 0 & t35 & 0 & t36 & 0 & t37 & 0 \\ t40 & 0 & t41 & 0 & t42 & 0 & t43 & 0 & t44 & 0 & t45 & 0 & t46 & 0 & t47 & 0 \\ t50 & 0 & t51 & 0 & t52 & 0 & t53 & 0 & t54 & 0 & t55 & 0 & t56 & 0 & t57 & 0 \\ t60 & 0 & t61 & 0 & t62 & 0 & t63 & 0 & t64 & 0 & t65 & 0 & t66 & 0 & t67 & 0 \\ t70 & 0 & t71 & 0 & t72 & 0 & t73 & 0 & t74 & 0 & t75 & 0 & t76 & 0 & t77 & 0 \end{bmatrix} \\ \begin{bmatrix} 0 & t00 & 0 & t01 & 0 & t02 & 0 & t03 & 0 & t04 & 0 & t05 & 0 & t06 & 0 & t07 \\ 0 & t10 & 0 & t11 & 0 & t12 & 0 & t13 & 0 & t14 & 0 & t15 & 0 & t16 & 0 & t17 \\ 0 & t20 & 0 & t21 & 0 & t22 & 0 & t23 & 0 & t24 & 0 & t25 & 0 & t26 & 0 & t27 \\ 0 & t30 & 0 & t31 & 0 & t32 & 0 & t33 & 0 & t34 & 0 & t35 & 0 & t36 & 0 & t37 \\ 0 & t40 & 0 & t41 & 0 & t42 & 0 & t43 & 0 & t44 & 0 & t45 & 0 & t46 & 0 & t47 \\ 0 & t50 & 0 & t51 & 0 & t52 & 0 & t53 & 0 & t54 & 0 & t55 & 0 & t56 & 0 & t57 \\ 0 & t60 & 0 & t61 & 0 & t62 & 0 & t63 & 0 & t64 & 0 & t65 & 0 & t66 & 0 & t67 \\ 0 & t70 & 0 & t71 & 0 & t72 & 0 & t73 & 0 & t74 & 0 & t75 & 0 & t76 & 0 & t77 \end{bmatrix} \end{bmatrix}$$

wherein [$IT8_2$] is in the following form:

$$[IT8_2] = \begin{bmatrix} T8^T & 0 \\ 0 & T8^T \end{bmatrix}$$

wherein [T8] is in the following form:

$$[T8] = \begin{bmatrix} t00 & t01 & t02 & t03 & t04 & t05 & t06 & t07 \\ t10 & t11 & t12 & t13 & t14 & t15 & t16 & t17 \\ t20 & t21 & t22 & t23 & t24 & t25 & t26 & t27 \\ t30 & t31 & t32 & t33 & t34 & t35 & t36 & t37 \\ t40 & t41 & t42 & t43 & t44 & t45 & t46 & t47 \\ t50 & t51 & t52 & t53 & t54 & t55 & t56 & t57 \\ t60 & t61 & t62 & t63 & t64 & t65 & t66 & t67 \\ t70 & t71 & t72 & t73 & t74 & t75 & t76 & t77 \end{bmatrix}$$

and wherein t00, t01, ... t77 are eight point DCT basis vectors.

4. The method of claim 3 wherein step a4) comprises the step of multiplying results from step a3) by [T4]/$\sqrt{2}$, wherein [T4] is given by the following equation:

$$[T4] = \begin{bmatrix} r00 & r01 & r02 & r03 \\ r10 & r11 & r12 & r13 \\ r20 & r21 & r22 & r23 \\ r30 & r31 & r32 & r33 \end{bmatrix}.$$

5. The method of claim 1 wherein step b) comprises the following steps:
   b1) dropping high order DCT coefficients from the field coded DCT coefficient blocks to produced downsized field coded DCT coefficient blocks;
   b2) performing an IDCT by columns on the downsized field coded DCT coefficient blocks; and,
   b3) separately performing an IDCT by rows on results from step b2).

6. The method of claim 5 wherein step b2) comprises the step of multiplying the downsized field coded DCT coefficient blocks by [T4]$^T$/$\sqrt{2}$, wherein [T4] is in the following form:

$$[T4] = \begin{bmatrix} r00 & r01 & r02 & r03 \\ r10 & r11 & r12 & r13 \\ r20 & r21 & r22 & r23 \\ r30 & r31 & r32 & r33 \end{bmatrix}$$

and wherein r00, r01, ... r33 are four point DCT basis vectors.

7. The method of claim 6 wherein step b3) comprises the step of multiplying results from step b2) by [T4]/$\sqrt{2}$.

8. The method of claim 7 wherein step a) comprises the following steps:
   a1) dropping high order DCT coefficients from the frame coded DCT coefficient blocks to produced downsized frame coded DCT coefficient blocks;
   a2) reordering the downsized frame coded DCT coefficient blocks;
   a3) converting the downsized frame coded DCT coefficient blocks to resulting field coded DCT coefficient blocks and performing an IDCT by columns on the resulting field coded DCT coefficient blocks; and,
   a4) separately performing an IDCT by rows on results from step a3).

9. The method of claim 8 wherein step a3) comprises the step of multiplying the resulting field coded DCT coefficient blocks by [Q3], wherein [Q3]=[IP4$_2$][T$_f$][IT8$_2$], wherein [IP4$_2$] is in the following form:

$$[IP4_2] = \begin{bmatrix} P4^T & 0 \\ 0 & P4^T \end{bmatrix}$$

wherein [P4] is in the following form:

$$[P4] = \begin{bmatrix} r00 & r01 & r02 & r03 & 0 & 0 & 0 & 0 \\ r10 & r11 & r12 & r13 & 0 & 0 & 0 & 0 \\ r20 & r21 & r22 & r23 & 0 & 0 & 0 & 0 \\ r30 & r31 & r32 & r33 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

wherein r00, r01, ... r33 are four point DCT basis vectors, wherein [T$_f$] is in the following form;

$$[T_f] = \begin{bmatrix} \begin{bmatrix} t00 & 0 & t01 & 0 & t02 & 0 & t03 & 0 & t04 & 0 & t05 & 0 & t06 & 0 & t07 & 0 \\ t10 & 0 & t11 & 0 & t12 & 0 & t13 & 0 & t14 & 0 & t15 & 0 & t16 & 0 & t17 & 0 \\ t20 & 0 & t21 & 0 & t22 & 0 & t23 & 0 & t24 & 0 & t25 & 0 & t26 & 0 & t27 & 0 \\ t30 & 0 & t31 & 0 & t32 & 0 & t33 & 0 & t34 & 0 & t35 & 0 & t36 & 0 & t37 & 0 \\ t40 & 0 & t41 & 0 & t42 & 0 & t43 & 0 & t44 & 0 & t45 & 0 & t46 & 0 & t47 & 0 \\ t50 & 0 & t51 & 0 & t52 & 0 & t53 & 0 & t54 & 0 & t55 & 0 & t56 & 0 & t57 & 0 \\ t60 & 0 & t61 & 0 & t62 & 0 & t63 & 0 & t64 & 0 & t65 & 0 & t66 & 0 & t67 & 0 \\ t70 & 0 & t71 & 0 & t72 & 0 & t73 & 0 & t74 & 0 & t75 & 0 & t76 & 0 & t77 & 0 \end{bmatrix} \\ \begin{bmatrix} 0 & t00 & 0 & t01 & 0 & t02 & 0 & t03 & 0 & t04 & 0 & t05 & 0 & t06 & 0 & t07 \\ 0 & t10 & 0 & t11 & 0 & t12 & 0 & t13 & 0 & t14 & 0 & t15 & 0 & t16 & 0 & t17 \\ 0 & t20 & 0 & t21 & 0 & t22 & 0 & t23 & 0 & t24 & 0 & t25 & 0 & t26 & 0 & t27 \\ 0 & t30 & 0 & t31 & 0 & t32 & 0 & t33 & 0 & t34 & 0 & t35 & 0 & t36 & 0 & t37 \\ 0 & t40 & 0 & t41 & 0 & t42 & 0 & t43 & 0 & t44 & 0 & t45 & 0 & t46 & 0 & t47 \\ 0 & t50 & 0 & t51 & 0 & t52 & 0 & t53 & 0 & t54 & 0 & t55 & 0 & t56 & 0 & t57 \\ 0 & t60 & 0 & t61 & 0 & t62 & 0 & t63 & 0 & t64 & 0 & t65 & 0 & t66 & 0 & t67 \\ 0 & t70 & 0 & t71 & 0 & t72 & 0 & t73 & 0 & t74 & 0 & t75 & 0 & t76 & 0 & t77 \end{bmatrix} \end{bmatrix}$$

wherein [IT8$_2$] is in the following form:

$$[IT8_2] = \begin{bmatrix} T8^T & 0 \\ 0 & T8^T \end{bmatrix}$$

wherein [T8] is in the following form:

$$[T8] = \begin{bmatrix} t00 & t01 & t02 & t03 & t04 & t05 & t06 & t07 \\ t10 & t11 & t12 & t13 & t14 & t15 & t16 & t17 \\ t20 & t21 & t22 & t23 & t24 & t25 & t26 & t27 \\ t30 & t31 & t32 & t33 & t34 & t35 & t36 & t37 \\ t40 & t41 & t42 & t43 & t44 & t45 & t46 & t47 \\ t50 & t51 & t52 & t53 & t54 & t55 & t56 & t57 \\ t60 & t61 & t62 & t63 & t64 & t65 & t66 & t67 \\ t70 & t71 & t72 & t73 & t74 & t75 & t76 & t77 \end{bmatrix}$$

and wherein t00, t01, ... t77 are eight point DCT basis vectors.

10. The method of claim 9 wherein step a4) comprises the step of multiplying results from step a3) by $[T4]/\sqrt{2}$.

11. The method of claim 5 wherein step a) comprises the following steps:

a1) dropping high order DCT coefficients from the frame coded DCT coefficient blocks to produced downsized frame coded DCT coefficient blocks;

a2) reordering the downsized frame coded DCT coefficient blocks;

a3) converting the downsized frame coded DCT coefficient blocks to resulting field coded. DCT coefficient blocks and performing an IDCT by columns on the resulting field coded DCT coefficient blocks; and, a4) separately performing an IDCT by rows on results from step a3).

12. The method of claim 11 wherein step c) comprises the following steps:

c1) translating the motion vector to a reference address;

c2) horizontally upsampling and downsampling the reference pixel blocks based on the reference address;

c3) for field prediction, vertically upsampling and downsampling the horizontally upsampled and downsampled reference pixel blocks; and, c4) for frame prediction, (i) vertically upsampling the horizontally upsampled and downsampled reference pixel blocks separately for fields a and b, (ii) if the motion vectors are fractional, combining the separately upsampled a and b fields into a reference frame block, then performing a half pixel interpolation on the combined frame block, and (iii) separately vertically downsampling the upsampled a and b fields.

13. The method of claim 1 wherein step c) comprises the following steps:

c1) translating the motion vector to a reference address;

c2) horizontally upsampling and downsampling the reference pixel blocks based on the reference address;

c3) for field prediction, vertically upsampling and downsampling the horizontally upsampled and downsampled reference pixel blocks; and, p1 c4) for frame prediction, (i) vertically upsampling the horizontally upsampled and downsampled reference pixel blocks separately for fields a and b, (ii) if the motion vectors are fractional, combining the separately upsampled a and b fields into a reference frame block, then performing a half pixel interpolation on the combined frame block, and (iii) separately vertically downsampling the upsampled a and b fields.

14. The method of claim 1 further comprising the step of storing only the reconstructed field blocks as the reference pixel blocks.

15. An apparatus for downconverting received frame and field coded DCT coefficient blocks to reconstructed pixel field blocks, the apparatus comprising:

an IDCT module arranged to convert the received frame coded DCT coefficient blocks to converted field coded DCT coefficient blocks and to perform an IDCT on the converted field coded DCT coefficient blocks and on the received field coded DCT coefficient blocks in order to produce downconverted pixel field blocks; and, a motion compensator arranged to apply motion compensation, as appropriate, to the downconverted pixel field blocks in order to produce the reconstructed pixel field blocks.

16. The apparatus of claim 15 wherein the received frame and field coded DCT coefficient blocks have motion vectors associated therewith, and wherein the motion compensator comprises:

a selector arranged to select reference pixel blocks based upon the motion vectors; and, an adder arranged to add the reference pixel blocks to the pixel field blocks to form the reconstructed pixel field blocks.

17. The apparatus of claim 16 wherein the selector comprises:

an upsampler arranged to upsample the reference pixel blocks; and a downsampler arranged to downsample the upsampled reference pixel blocks.

18. The apparatus of claim 16 wherein the selector comprises:

a translator arranged to translate the motion vector to a reference address;

a horizontal upsampler and downsampler arranged to horizontally upsample and downsample the reference pixel blocks based on the reference address;

a first vertical upsampler and downsampler arranged during field prediction to vertically upsample and downsample the horizontally upsampled and downsampled reference pixel blocks when field coded DCT coefficient blocks are received; and, a second vertical upsampler and downsampler arranged during frame prediction to (i) vertically upsample the horizontally upsampled and downsampled reference pixel blocks separately for fields a and b, (ii) if the motion vectors are fractional, combine the separately upsampled a and b fields into a reference frame block, then perform a half pixel interpolation on the combined frame block, and (iii) separately vertically downsample the upsampled a and b fields.

19. The apparatus of claim 15 wherein the IDCT module comprises:

a discarder arranged to discard high order DCT coefficients from the frame coded DCT coefficient blocks to produce downsized frame coded DCT coefficient blocks;

a reorderer arranged to reorder the downsized frame coded DCT coefficient blocks;

a column IDCT module arranged to perform an IDCT by columns on the reordered and downsized frame coded DCT coefficient blocks; and, a separate row IDCT module arranged to perform an IDCT by rows on results from the column IDCT module.

20. The apparatus of claim 19 wherein the column IDCT module comprises a multiplier arranged to multiply the reordered and downsized frame coded DCT coefficient blocks by [Q3], wherein $[Q3]=[IP4_2][T_f][IT8_2]$, wherein $[IP4_2]$ is in the following form:

$$[IP4_2] = \begin{bmatrix} P4^T & 0 \\ 0 & P4^T \end{bmatrix}$$

wherein [P4] is in the following form:

$$[P4] = \begin{bmatrix} r00 & r01 & r02 & r03 & 0 & 0 & 0 & 0 \\ r10 & r11 & r12 & r13 & 0 & 0 & 0 & 0 \\ r20 & r21 & r22 & r23 & 0 & 0 & 0 & 0 \\ r30 & r31 & r32 & r33 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \Big/ \sqrt{2}$$

wherein r00, r01, . . . r33 are four point DCT basis vectors, wherein $[T_f]$ is in the following form:

$$[T_f] = \begin{bmatrix} \begin{bmatrix} t00 & 0 & t01 & 0 & t02 & 0 & t03 & 0 & t04 & 0 & t05 & 0 & t06 & 0 & t07 & 0 \\ t10 & 0 & t11 & 0 & t12 & 0 & t13 & 0 & t14 & 0 & t15 & 0 & t16 & 0 & t17 & 0 \\ t20 & 0 & t21 & 0 & t22 & 0 & t23 & 0 & t24 & 0 & t25 & 0 & t26 & 0 & t27 & 0 \\ t30 & 0 & t31 & 0 & t32 & 0 & t33 & 0 & t34 & 0 & t35 & 0 & t36 & 0 & t37 & 0 \\ t40 & 0 & t41 & 0 & t42 & 0 & t43 & 0 & t44 & 0 & t45 & 0 & t46 & 0 & t47 & 0 \\ t50 & 0 & t51 & 0 & t52 & 0 & t53 & 0 & t54 & 0 & t55 & 0 & t56 & 0 & t57 & 0 \\ t60 & 0 & t61 & 0 & t62 & 0 & t63 & 0 & t64 & 0 & t65 & 0 & t66 & 0 & t67 & 0 \\ t70 & 0 & t71 & 0 & t72 & 0 & t73 & 0 & t74 & 0 & t75 & 0 & t76 & 0 & t77 & 0 \end{bmatrix} \\ \begin{bmatrix} 0 & t00 & 0 & t01 & 0 & t02 & 0 & t03 & 0 & t04 & 0 & t05 & 0 & t06 & 0 & t07 \\ 0 & t10 & 0 & t11 & 0 & t12 & 0 & t13 & 0 & t14 & 0 & t15 & 0 & t16 & 0 & t17 \\ 0 & t20 & 0 & t21 & 0 & t22 & 0 & t23 & 0 & t24 & 0 & t25 & 0 & t26 & 0 & t27 \\ 0 & t30 & 0 & t31 & 0 & t32 & 0 & t33 & 0 & t34 & 0 & t35 & 0 & t36 & 0 & t37 \\ 0 & t40 & 0 & t41 & 0 & t42 & 0 & t43 & 0 & t44 & 0 & t45 & 0 & t46 & 0 & t47 \\ 0 & t50 & 0 & t51 & 0 & t52 & 0 & t53 & 0 & t54 & 0 & t55 & 0 & t56 & 0 & t57 \\ 0 & t60 & 0 & t61 & 0 & t62 & 0 & t63 & 0 & t64 & 0 & t65 & 0 & t66 & 0 & t67 \\ 0 & t70 & 0 & t71 & 0 & t72 & 0 & t73 & 0 & t74 & 0 & t75 & 0 & t76 & 0 & t77 \end{bmatrix} \end{bmatrix}$$

wherein [IT8₂] is in the following form:

$$[IT8_2] = \begin{bmatrix} T8^T & 0 \\ 0 & T8^T \end{bmatrix}$$

wherein [T8] is in the following form:

$$[T8] = \begin{bmatrix} t00 & t01 & t02 & t03 & t04 & t05 & t06 & t07 \\ t10 & t11 & t12 & t13 & t14 & t15 & t16 & t17 \\ t20 & t21 & t22 & t23 & t24 & t25 & t26 & t27 \\ t30 & t31 & t32 & t33 & t34 & t35 & t36 & t37 \\ t40 & t41 & t42 & t43 & t44 & t45 & t46 & t47 \\ t50 & t51 & t52 & t53 & t54 & t55 & t56 & t57 \\ t60 & t61 & t62 & t63 & t64 & t65 & t66 & t67 \\ t70 & t71 & t72 & t73 & t74 & t75 & t76 & t77 \end{bmatrix}$$

and wherein t00, t01, . . . t77 are eight point DCT basis vectors.

21. The apparatus of claim 20 wherein the multiplier is a first multiplier, and wherein the row IDCT module comprises a second multiplier arranged to multiply results from the first multiplier by $[T4]/\sqrt{2}$, and wherein [T4] is given by the following equation:

$$[T4] = \begin{bmatrix} r00 & r01 & r02 & r03 \\ r10 & r11 & r12 & r13 \\ r20 & r21 & r22 & r23 \\ r30 & r31 & r32 & r33 \end{bmatrix}.$$

22. The apparatus of claim 15 wherein the IDCT module comprises:

a discarder arranged to discard high order DCT coefficients from the field coded DCT coefficient blocks to produce downsized field coded DCT coefficient blocks;

a column IDCT module arranged to perform an IDCT by columns on the downsized field coded DCT coefficient blocks; and, a separate row IDCT module arranged to perform an IDCT by rows on results from the column IDCT module.

23. The apparatus of claim 22 wherein the column IDCT module comprises a multiplier arranged to multiply the downsized field coded DCT coefficient blocks by $[T4]^T/\sqrt{2}$, wherein [T4] is given by the following equation:

$$[T4] = \begin{bmatrix} r00 & r01 & r02 & r03 \\ r10 & r11 & r12 & r13 \\ r20 & r21 & r22 & r23 \\ r30 & r31 & r32 & r33 \end{bmatrix}$$

and wherein r00, r01, . . . r33 are four point DCT basis vectors.

24. The apparatus of claim 23 wherein the multiplier is a first multiplier, and wherein the row IDCT module comprises a second multiplier arranged to multiply results from the first multiplier by $[T4]/\sqrt{2}$.

25. The apparatus of claim 24 wherein the discarder is a first discarder, wherein the column IDCT module is a first column IDCT module, wherein the row IDCT module is first row IDCT module, and wherein the IDCT module further comprises:

a second discarder arranged to discard high order horizontal DCT coefficients from the frame coded DCT coefficient blocks to produce downsized frame coded DCT coefficient blocks;

a reorderer arranged to reorder the downsized frame coded DCT coefficient blocks;

a second column IDCT module arranged to perform an IDCT by columns on the reordered and downsized frame coded DCT coefficient blocks; and, a second row IDCT module arranged to perform an IDCT by rows on results from the second column IDCT module.

26. The apparatus of claim 25 wherein the second column IDCT module comprises a third multiplier arranged to multiply the reordered and downsized frame coded DCT coefficient blocks by [Q3], wherein [Q3]=[IP4₂][T_f][IT8₂], wherein [IP4₂] is in the following form:

$$[IP4_2] = \begin{bmatrix} P4^T & 0 \\ 0 & P4^T \end{bmatrix}$$

wherein [P4] is in the following form:

$$[P4] = \begin{bmatrix} r00 & r01 & r02 & r03 & 0 & 0 & 0 & 0 \\ r10 & r11 & r12 & r13 & 0 & 0 & 0 & 0 \\ r20 & r21 & r22 & r23 & 0 & 0 & 0 & 0 \\ r30 & r31 & r32 & r33 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \Big/ \sqrt{2}$$

wherein r00, r01, . . . r33 are four point DCT basis vectors, wherein [T_f] is in the following form:

$$[T_f] = \begin{bmatrix} \begin{bmatrix} t00 & 0 & t01 & 0 & t02 & 0 & t03 & 0 & t04 & 0 & t05 & 0 & t06 & 0 & t07 & 0 \\ t10 & 0 & t11 & 0 & t12 & 0 & t13 & 0 & t14 & 0 & t15 & 0 & t16 & 0 & t17 & 0 \\ t20 & 0 & t21 & 0 & t22 & 0 & t23 & 0 & t24 & 0 & t25 & 0 & t26 & 0 & t27 & 0 \\ t30 & 0 & t31 & 0 & t32 & 0 & t33 & 0 & t34 & 0 & t35 & 0 & t36 & 0 & t37 & 0 \\ t40 & 0 & t41 & 0 & t42 & 0 & t43 & 0 & t44 & 0 & t45 & 0 & t46 & 0 & t47 & 0 \\ t50 & 0 & t51 & 0 & t52 & 0 & t53 & 0 & t54 & 0 & t55 & 0 & t56 & 0 & t57 & 0 \\ t60 & 0 & t61 & 0 & t62 & 0 & t63 & 0 & t64 & 0 & t65 & 0 & t66 & 0 & t67 & 0 \\ t70 & 0 & t71 & 0 & t72 & 0 & t73 & 0 & t74 & 0 & t75 & 0 & t76 & 0 & t77 & 0 \end{bmatrix} \\ \begin{bmatrix} 0 & t00 & 0 & t01 & 0 & t02 & 0 & t03 & 0 & t04 & 0 & t05 & 0 & t06 & 0 & t07 \\ 0 & t10 & 0 & t11 & 0 & t12 & 0 & t13 & 0 & t14 & 0 & t15 & 0 & t16 & 0 & t17 \\ 0 & t20 & 0 & t21 & 0 & t22 & 0 & t23 & 0 & t24 & 0 & t25 & 0 & t26 & 0 & t27 \\ 0 & t30 & 0 & t31 & 0 & t32 & 0 & t33 & 0 & t34 & 0 & t35 & 0 & t36 & 0 & t37 \\ 0 & t40 & 0 & t41 & 0 & t42 & 0 & t43 & 0 & t44 & 0 & t45 & 0 & t46 & 0 & t47 \\ 0 & t50 & 0 & t51 & 0 & t52 & 0 & t53 & 0 & t54 & 0 & t55 & 0 & t56 & 0 & t57 \\ 0 & t60 & 0 & t61 & 0 & t62 & 0 & t63 & 0 & t64 & 0 & t65 & 0 & t66 & 0 & t67 \\ 0 & t70 & 0 & t71 & 0 & t72 & 0 & t73 & 0 & t74 & 0 & t75 & 0 & t76 & 0 & t77 \end{bmatrix} \end{bmatrix}$$

wherein [IT8$_2$] is in the following form:

$$[IT8_2] = \begin{bmatrix} T8^T & 0 \\ 0 & T8^T \end{bmatrix}$$

wherein [T8] is in the following form:

$$[T8] = \begin{bmatrix} t00 & t01 & t02 & t03 & t04 & t05 & t06 & t07 \\ t10 & t11 & t12 & t13 & t14 & t15 & t16 & t17 \\ t20 & t21 & t22 & t23 & t24 & t25 & t26 & t27 \\ t30 & t31 & t32 & t33 & t34 & t35 & t36 & t37 \\ t40 & t41 & t42 & t43 & t44 & t45 & t46 & t47 \\ t50 & t51 & t52 & t53 & t54 & t55 & t56 & t57 \\ t60 & t61 & t62 & t63 & t64 & t65 & t66 & t67 \\ t70 & t71 & t72 & t73 & t74 & t75 & t76 & t77 \end{bmatrix}$$

and wherein t00, t01, . . . t77 are eight point DCT basis vectors.

27. The apparatus of claim 26 wherein the second row IDCT module comprises a fourth multiplier arranged to multiply results from the third multiplier by [T4]/√2.

28. The apparatus of claim 22 wherein the discarder is a first discarder, wherein the column IDCT module is a first column IDCT module, wherein the row IDCT module is first row IDCT module, and wherein the IDCT module further comprises:
   a second discarder arranged to discard high order DCT coefficients from the frame coded DCT coefficient blocks to produce downsized frame coded DCT coefficient blocks;
   a reorderer arranged to reorder the downsized frame coded DCT coefficient blocks;
   a second column IDCT module arranged to performing an IDCT by columns on the reordered and downsized frame coded DCT coefficient blocks; and,
   a second row IDCT module arranged to performing an IDCT by rows on results from the second column IDCT module.

29. The apparatus of claim 15 wherein the motion compensator comprises:
   a selector arranged to select reference pixel blocks based upon the motion vectors;
   an adder arranged to add the reference pixel blocks to the pixel field blocks to form the reconstructed pixel field blocks; and,
   a reference picture memory arranged to store only the reconstructed pixel field blocks as the reference pixel blocks.

30. An apparatus for downconverting received frame and field coded DCT coefficient blocks to downconverted pixel field blocks, the apparatus comprising:
   a first IDCT module arranged to convert the received frame coded DCT coefficient blocks to converted field coded DCT coefficient blocks and to perform a downconverting IDCT on the converted field coded DCT coefficient blocks in order to produce first downconverted pixel field blocks; and,
   a second IDCT module arranged to directly perform a downconverting IDCT on the received field coded DCT coefficient blocks in order to produce second downconverted pixel field blocks.

31. The apparatus of claim 30 wherein the received frame and field coded DCT coefficient blocks have motion vectors associated therewith, and wherein the apparatus further comprises:
   a selector arranged to select reference pixel blocks from a reference picture memory based upon the motion vectors; and,
   an adder arranged to add the reference pixel blocks to the first and second downconverted pixel field blocks in order to form reconstructed pixel field blocks.

32. The apparatus of claim 31 wherein the selector comprises:
   an upsampler arranged to upsample the reference pixel blocks; and,
   a downsampler arranged to downsample the upsampled reference pixel blocks.

33. The apparatus of claim 31 wherein the selector comprises:
   a translator arranged to translate the motion vector to a reference address;
   a horizontal upsampler and downsampler arranged to horizontally upsample and downsample the reference pixel blocks based on the reference address;
   a first vertical upsampler and downsampler arranged during field prediction to vertically upsample and downsample the horizontally upsampled and downsampled reference pixel blocks when field coded DCT coefficient blocks are received; and,
   a first vertical upsampler and downsampler arranged during frame prediction to (i) vertically upsample the horizontally upsampled and downsampled reference pixel blocks separately for fields a and b, (ii) if the motion vectors are fractional, combine the separately upsampled a and b fields into a reference frame block, then perform a half pixel interpolation on the combined frame block, and (iii) separately vertically downsample the upsampled a and b fields.

34. The apparatus of claim 30 wherein the first IDCT module comprise:
   a discarder arranged to discard high order horizontal DCT coefficients from the frame coded DCT coefficient blocks to produce downsized frame coded DCT coefficient blocks;
   a reorderer arranged to reorder the downsized frame coded DCT coefficient blocks;
   a column IDCT module arranged to perform an IDCT by columns on the reordered and downsized frame coded DCT coefficient blocks; and,
   a separate row IDCT module arranged to perform an IDCT by rows on results from the column IDCT module.

35. The apparatus of claim 34 wherein the column IDCT module comprises a multiplier arranged to multiply the reordered and downsized frame coded DCT coefficient blocks by [Q3], wherein [Q3]=[IP4$_2$][T$_f$][IT8$_2$], wherein [IP4$_2$] is in the following form:

$$[IP4_2] = \begin{bmatrix} P4^T & 0 \\ 0 & P4^T \end{bmatrix}$$

wherein [P4] is in the following form:

$$[P4] = \begin{bmatrix} r00 & r01 & r02 & r03 & 0 & 0 & 0 & 0 \\ r10 & r11 & r12 & r13 & 0 & 0 & 0 & 0 \\ r20 & r21 & r22 & r23 & 0 & 0 & 0 & 0 \\ r30 & r31 & r32 & r33 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \Big/ \sqrt{2}$$

wherein r00, r01, . . . r33 are four point DCT basis vectors, wherein [$T_f$] is in the following form:

$$[T_f] = \begin{bmatrix} \begin{bmatrix} t00 & 0 & t01 & 0 & t02 & 0 & t03 & 0 & t04 & 0 & t05 & 0 & t06 & 0 & t07 & 0 \\ t10 & 0 & t11 & 0 & t12 & 0 & t13 & 0 & t14 & 0 & t15 & 0 & t16 & 0 & t17 & 0 \\ t20 & 0 & t21 & 0 & t22 & 0 & t23 & 0 & t24 & 0 & t25 & 0 & t26 & 0 & t27 & 0 \\ t30 & 0 & t31 & 0 & t32 & 0 & t33 & 0 & t34 & 0 & t35 & 0 & t36 & 0 & t37 & 0 \\ t40 & 0 & t41 & 0 & t42 & 0 & t43 & 0 & t44 & 0 & t45 & 0 & t46 & 0 & t47 & 0 \\ t50 & 0 & t51 & 0 & t52 & 0 & t53 & 0 & t54 & 0 & t55 & 0 & t56 & 0 & t57 & 0 \\ t60 & 0 & t61 & 0 & t62 & 0 & t63 & 0 & t64 & 0 & t65 & 0 & t66 & 0 & t67 & 0 \\ t70 & 0 & t71 & 0 & t72 & 0 & t73 & 0 & t74 & 0 & t75 & 0 & t76 & 0 & t77 & 0 \end{bmatrix} \\ \begin{bmatrix} 0 & t00 & 0 & t01 & 0 & t02 & 0 & t03 & 0 & t04 & 0 & t05 & 0 & t06 & 0 & t07 \\ 0 & t10 & 0 & t11 & 0 & t12 & 0 & t13 & 0 & t14 & 0 & t15 & 0 & t16 & 0 & t17 \\ 0 & t20 & 0 & t21 & 0 & t22 & 0 & t23 & 0 & t24 & 0 & t25 & 0 & t26 & 0 & t27 \\ 0 & t30 & 0 & t31 & 0 & t32 & 0 & t33 & 0 & t34 & 0 & t35 & 0 & t36 & 0 & t37 \\ 0 & t40 & 0 & t41 & 0 & t42 & 0 & t43 & 0 & t44 & 0 & t45 & 0 & t46 & 0 & t47 \\ 0 & t50 & 0 & t51 & 0 & t52 & 0 & t53 & 0 & t54 & 0 & t55 & 0 & t56 & 0 & t57 \\ 0 & t60 & 0 & t61 & 0 & t62 & 0 & t63 & 0 & t64 & 0 & t65 & 0 & t66 & 0 & t67 \\ 0 & t70 & 0 & t71 & 0 & t72 & 0 & t73 & 0 & t74 & 0 & t75 & 0 & t76 & 0 & t77 \end{bmatrix} \end{bmatrix}$$

wherein [$IT8_2$] is in the following form:

$$[IT8_2] = \begin{bmatrix} T8^T & 0 \\ 0 & T8^T \end{bmatrix}$$

wherein [T8] is in the following form:

$$[T8] = \begin{bmatrix} t00 & t01 & t02 & t03 & t04 & t05 & t06 & t07 \\ t10 & t11 & t12 & t13 & t14 & t15 & t16 & t17 \\ t20 & t21 & t22 & t23 & t24 & t25 & t26 & t27 \\ t30 & t31 & t32 & t33 & t34 & t35 & t36 & t37 \\ t40 & t41 & t42 & t43 & t44 & t45 & t46 & t47 \\ t50 & t51 & t52 & t53 & t54 & t55 & t56 & t57 \\ t60 & t61 & t62 & t63 & t64 & t65 & t66 & t67 \\ t70 & t71 & t72 & t73 & t74 & t75 & t76 & t77 \end{bmatrix} \quad [IT8_2] = \begin{bmatrix} T8^T & 0 \\ 0 & T8^T \end{bmatrix}$$

and wherein t00, t01, . . . t77 are eight point DCT basis vectors.

36. The apparatus of claim 35 wherein the multiplier is a first multiplier, and wherein the row IDCT module comprises a second multiplier arranged to multiply results from the first multiplier by [T4]/$\sqrt{2}$, and wherein [T4] is given by the following equation:

$$[T4] = \begin{bmatrix} r00 & r01 & r02 & r03 \\ r10 & r11 & r12 & r13 \\ r20 & r21 & r22 & r23 \\ r30 & r31 & r32 & r33 \end{bmatrix}.$$

37. The apparatus of claim 30 wherein the second IDCT module comprises:
  a discarder arranged to discard high order DCT coefficients from the field coded DCT coefficient blocks to produce downsized field coded DCT coefficient blocks;
  a column IDCT module arranged to perform an IDCT by columns on the downsized field coded DCT coefficient blocks; and,
  a separate row IDCT module arranged to perform an IDCT by rows on results from the column IDCT module.

38. The apparatus of claim 37 wherein the column IDCT module comprises a multiplier arranged to multiply the downsized field coded DCT coefficient blocks by [T4]$^T$/$\sqrt{2}$, wherein [T4] is given by the following equation:

$$[T4] = \begin{bmatrix} r00 & r01 & r02 & r03 \\ r10 & r11 & r12 & r13 \\ r20 & r21 & r22 & r23 \\ r30 & r31 & r32 & r33 \end{bmatrix}$$

and wherein r00, r01, . . . r33 are four point DCT basis vectors.

39. The apparatus of claim 38 wherein the multiplier is a first multiplier, and wherein the row IDCT module comprises a second multiplier arranged to multiply results from the first multiplier by [T4]/$\sqrt{2}$.

40. The apparatus of claim 39 wherein the discarder is a first discarder, wherein the column IDCT module is a first column IDCT module, wherein the row IDCT module is first row IDCT module, and wherein the first IDCT module further comprises:
  a second discarder arranged to discard high order horizontal DCT coefficients from the frame coded DCT coefficient blocks to produce downsized frame coded DCT coefficient blocks;
  a reorderer arranged to reorder the downsized frame coded DCT coefficient blocks;
  a second column IDCT module arranged to perform an IDCT by columns on the reordered and downsized frame coded DCT coefficient blocks; and, a second row IDCT module arranged to perform an IDCT by rows on results from the second column IDCT module.

41. The apparatus of claim 40 wherein the second column IDCT module comprises a third multiplier arranged to multiply the reordered and downsized frame coded DCT coefficient blocks by [Q3], wherein [Q3]=[IP4$_2$][T$_f$][IT8$_2$], wherein [IP4$_2$] is in the following form:

$$[IP4_2] = \begin{bmatrix} P4^T & 0 \\ 0 & P4^T \end{bmatrix}$$

wherein [P4] is in the following form:

$$[P4] = \begin{bmatrix} r00 & r01 & r02 & r03 & 0 & 0 & 0 & 0 \\ r10 & r11 & r12 & r13 & 0 & 0 & 0 & 0 \\ r20 & r21 & r22 & r23 & 0 & 0 & 0 & 0 \\ r30 & r31 & r32 & r33 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} / \sqrt{2}$$

wherein r00, r01, . . . r33 are four point DCT basis vectors, wherein [T$_f$] is in the following form:

$$[T_f] = \begin{bmatrix} \begin{bmatrix} t00 & 0 & t01 & 0 & t02 & 0 & t03 & 0 & t04 & 0 & t05 & 0 & t06 & 0 & t07 & 0 \\ t10 & 0 & t11 & 0 & t12 & 0 & t13 & 0 & t14 & 0 & t15 & 0 & t16 & 0 & t17 & 0 \\ t20 & 0 & t21 & 0 & t22 & 0 & t23 & 0 & t24 & 0 & t25 & 0 & t26 & 0 & t27 & 0 \\ t30 & 0 & t31 & 0 & t32 & 0 & t33 & 0 & t34 & 0 & t35 & 0 & t36 & 0 & t37 & 0 \\ t40 & 0 & t41 & 0 & t42 & 0 & t43 & 0 & t44 & 0 & t45 & 0 & t46 & 0 & t47 & 0 \\ t50 & 0 & t51 & 0 & t52 & 0 & t53 & 0 & t54 & 0 & t55 & 0 & t56 & 0 & t57 & 0 \\ t60 & 0 & t61 & 0 & t62 & 0 & t63 & 0 & t64 & 0 & t65 & 0 & t66 & 0 & t67 & 0 \\ t70 & 0 & t71 & 0 & t72 & 0 & t73 & 0 & t74 & 0 & t75 & 0 & t76 & 0 & t77 & 0 \end{bmatrix} \\ \begin{bmatrix} 0 & t00 & 0 & t01 & 0 & t02 & 0 & t03 & 0 & t04 & 0 & t05 & 0 & t06 & 0 & t07 \\ 0 & t10 & 0 & t11 & 0 & t12 & 0 & t13 & 0 & t14 & 0 & t15 & 0 & t16 & 0 & t17 \\ 0 & t20 & 0 & t21 & 0 & t22 & 0 & t23 & 0 & t24 & 0 & t25 & 0 & t26 & 0 & t27 \\ 0 & t30 & 0 & t31 & 0 & t32 & 0 & t33 & 0 & t34 & 0 & t35 & 0 & t36 & 0 & t37 \\ 0 & t40 & 0 & t41 & 0 & t42 & 0 & t43 & 0 & t44 & 0 & t45 & 0 & t46 & 0 & t47 \\ 0 & t50 & 0 & t51 & 0 & t52 & 0 & t53 & 0 & t54 & 0 & t55 & 0 & t56 & 0 & t57 \\ 0 & t60 & 0 & t61 & 0 & t62 & 0 & t63 & 0 & t64 & 0 & t65 & 0 & t66 & 0 & t67 \\ 0 & t70 & 0 & t71 & 0 & t72 & 0 & t73 & 0 & t74 & 0 & t75 & 0 & t76 & 0 & t77 \end{bmatrix} \end{bmatrix}$$

wherein [IT8$_2$] is in the following form:

$$[IT8_2] = \begin{bmatrix} T8^T & 0 \\ 0 & T8^T \end{bmatrix}$$

wherein [T8] is in the following form:

$$[T8] = \begin{bmatrix} t00 & t01 & t02 & t03 & t04 & t05 & t06 & t07 \\ t10 & t11 & t12 & t13 & t14 & t15 & t16 & t17 \\ t20 & t21 & t22 & t23 & t24 & t25 & t26 & t27 \\ t30 & t31 & t32 & t33 & t34 & t35 & t36 & t37 \\ t40 & t41 & t42 & t43 & t44 & t45 & t46 & t47 \\ t50 & t51 & t52 & t53 & t54 & t55 & t56 & t57 \\ t60 & t61 & t62 & t63 & t64 & t65 & t66 & t67 \\ t70 & t71 & t72 & t73 & t74 & t75 & t76 & t77 \end{bmatrix}$$

and wherein t00, t01, . . . t77 are eight point DCT basis vectors.

42. The apparatus of claim 41 Wherein the second row IDCT module comprises a fourth multiplier arranged to multiply results from the third multiplier by $[T4]/\sqrt{2}$.

43. The apparatus of claim 37 wherein the discarder is a first discarder, wherein the column IDCT module is a first column IDCT module, wherein the row IDCT module is a first row IDCT module, and wherein the IDCT module further comprises:
a second discarder arranged to discard high order horizontal DCT coefficients from the frame coded DCT coefficient blocks to produce downsized frame coded DCT coefficient blocks;
a reorderer arranged to reorder the downsized frame coded DCT coefficient blocks;
a second column IDCT module arranged to perform an IDCT by columns on the reordered and downsized frame coded DCT coefficient blocks; and,
a second row IDCT module arranged to perform an IDCT by rows on results from the second column IDCT module.

44. The apparatus of claim 30 further comprising:
a selector arranged to select reference pixel blocks based upon the motion vectors;
an adder arranged to add the reference pixel blocks to the pixel field blocks to form reconstructed pixel field blocks; and,
a reference picture memory arranged to store only the reconstructed pixel field blocks as the reference pixel blocks.

* * * * *